United States Patent
Monaco et al.

(10) Patent No.: US 10,990,998 B2
(45) Date of Patent: Apr. 27, 2021

(54) POS TERMINAL(S) WITH FREE FORM REWARDS ARCHITECTURE

(71) Applicant: Bank of America Corporation, Charlotte, NC (US)

(72) Inventors: Mark Churchill Monaco, New York, NY (US); Tony England, Tega Cay, SC (US); Matthew D. Murphy, Charlotte, NC (US); David C. Tyrie, Boston, MA (US)

(73) Assignee: Bank of America Corporation, Charlotte, NC (US)

( * ) Notice: Subject to any disclaimer, the term of this patent is extended or adjusted under 35 U.S.C. 154(b) by 337 days.

(21) Appl. No.: 15/977,317

(22) Filed: May 11, 2018

(65) Prior Publication Data

US 2019/0147484 A1 May 16, 2019

Related U.S. Application Data

(60) Provisional application No. 62/586,409, filed on Nov. 15, 2017.

(51) Int. Cl.
*G06Q 30/02* (2012.01)
*G06Q 20/40* (2012.01)
(Continued)

(52) U.S. Cl.
CPC ....... *G06Q 30/0238* (2013.01); *G06Q 20/027* (2013.01); *G06Q 20/065* (2013.01);
(Continued)

(58) Field of Classification Search
CPC ............. G06Q 30/0238; G06Q 20/202; G06Q 20/227; G06Q 30/0234; G06Q 30/0235;
(Continued)

(56) References Cited

U.S. PATENT DOCUMENTS

| 6,970,837 B1 * | 11/2005 | Walker | G06Q 20/10 705/14.26 |
| 7,464,050 B1 * | 12/2008 | Deaton | G06Q 20/20 705/14.1 |

(Continued)

OTHER PUBLICATIONS

Maxing Credit Card Benefits Using Location Based Data An IP.com Prior Art Database Technical Disclosure Authors et. al.: Melvin Quintos John Jenkins IP.com Electronic Publication Date: Oct. 29, 2017 (Year: 2017).*

(Continued)

*Primary Examiner* — Alexandru Cirnu
(74) *Attorney, Agent, or Firm* — Weiss & Arons LLP; Michael A. Springs, Esq.

(57) ABSTRACT

A merchant point-of-sale ("POS") system architecture is provided. Systems and methods are provided for enabling free form rewards in a custom rewards transaction at a POS terminal. A custom rewards transaction may be a transaction in which a customer opts-in to a merchant-funded rewards ("MFR") program. The merchant may offer rewards in the MFR program based on location and customer data. The merchant may offer rewards that promote customer behaviors that are advantageous to the merchant. Opting-in to the MFR program may terminate the customer's default enrollment in a conventional issuer-bank funded rewards program.

12 Claims, 8 Drawing Sheets

(51) Int. Cl.

| | |
|---|---|
| *G06Q 20/20* | (2012.01) |
| *H04L 9/06* | (2006.01) |
| *G06Q 20/22* | (2012.01) |
| *G06Q 20/02* | (2012.01) |
| *G07G 1/00* | (2006.01) |
| *G06Q 20/06* | (2012.01) |
| *G06Q 20/10* | (2012.01) |
| *G06Q 20/38* | (2012.01) |
| *G06Q 20/24* | (2012.01) |
| *H04W 4/30* | (2018.01) |
| *G06Q 50/00* | (2012.01) |

(52) U.S. Cl.
CPC .......... *G06Q 20/102* (2013.01); *G06Q 20/20* (2013.01); *G06Q 20/202* (2013.01); *G06Q 20/227* (2013.01); *G06Q 20/24* (2013.01); *G06Q 20/387* (2013.01); *G06Q 20/40* (2013.01); *G06Q 20/4016* (2013.01); *G06Q 30/0213* (2013.01); *G06Q 30/0217* (2013.01); *G06Q 30/0226* (2013.01); *G06Q 30/0233* (2013.01); *G06Q 30/0234* (2013.01); *G06Q 30/0235* (2013.01); *G06Q 30/0258* (2013.01); *G06Q 30/0269* (2013.01); *G07G 1/0009* (2013.01); *H04L 9/0637* (2013.01); *G06Q 50/01* (2013.01); *H04L 2209/38* (2013.01); *H04W 4/30* (2018.02)

(58) Field of Classification Search
CPC ............. G06Q 20/027; G06Q 30/0226; G06Q 20/4016; G06Q 30/0213; G06Q 30/0217; G06Q 30/0233; G06Q 30/0258; G06Q 30/0269; G06Q 20/065; G06Q 20/102; G06Q 20/387; G06Q 20/24; G06Q 20/40; G06Q 20/20; G06Q 50/01; G06Q 20/322; H04L 9/0637; H04L 2209/38; G07G 1/0009; H04W 4/30

See application file for complete search history.

(56) References Cited

U.S. PATENT DOCUMENTS

| | | | |
|---|---|---|---|
| 7,496,523 B2 * | 2/2009 | Walker | G06Q 10/06311 705/14.21 |
| 7,516,883 B2 | 4/2009 | Hardesty et al. | |
| 8,682,791 B2 | 3/2014 | Bies et al. | |
| 9,665,879 B2 | 5/2017 | Aloni et al. | |
| 9,697,520 B2 | 7/2017 | MacLlwaine et al. | |
| 9,818,266 B2 | 11/2017 | Murphy | |
| 9,836,743 B2 | 12/2017 | Celikyilmaz et al. | |
| 9,846,888 B2 | 12/2017 | Perreault et al. | |
| 2008/0077508 A1 * | 3/2008 | Bezos | G06Q 30/0641 705/26.8 |
| 2010/0250379 A1 * | 9/2010 | Giordano | G06Q 20/00 705/20 |
| 2011/0225033 A1 * | 9/2011 | Schmeyer | G06F 21/31 705/14.32 |
| 2013/0046635 A1 * | 2/2013 | Grigg | G06Q 30/0238 705/14.58 |
| 2013/0254009 A1 | 9/2013 | Barr | |
| 2014/0214509 A1 | 7/2014 | Lee et al. | |
| 2014/0372238 A1 | 12/2014 | Murphy et al. | |
| 2015/0254615 A1 | 9/2015 | Karim | |
| 2016/0232556 A1 | 8/2016 | Postrel | |
| 2017/0017942 A1 | 1/2017 | Nix et al. | |
| 2017/0330217 A1 | 11/2017 | Postrel | |

OTHER PUBLICATIONS

Method and System for Optimization of Point-Of-Service Promotional Offers An IP.com Prior Art Database Technical Disclosure Authors et. al.: Disclosed Anonymously (Year: 2012).*

* cited by examiner

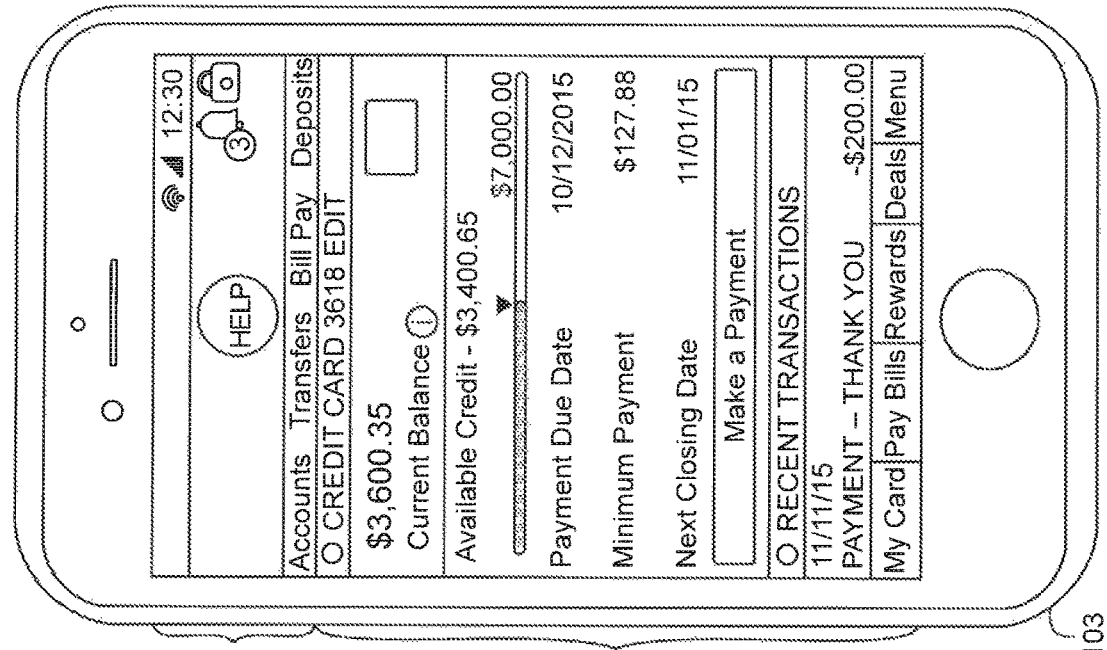
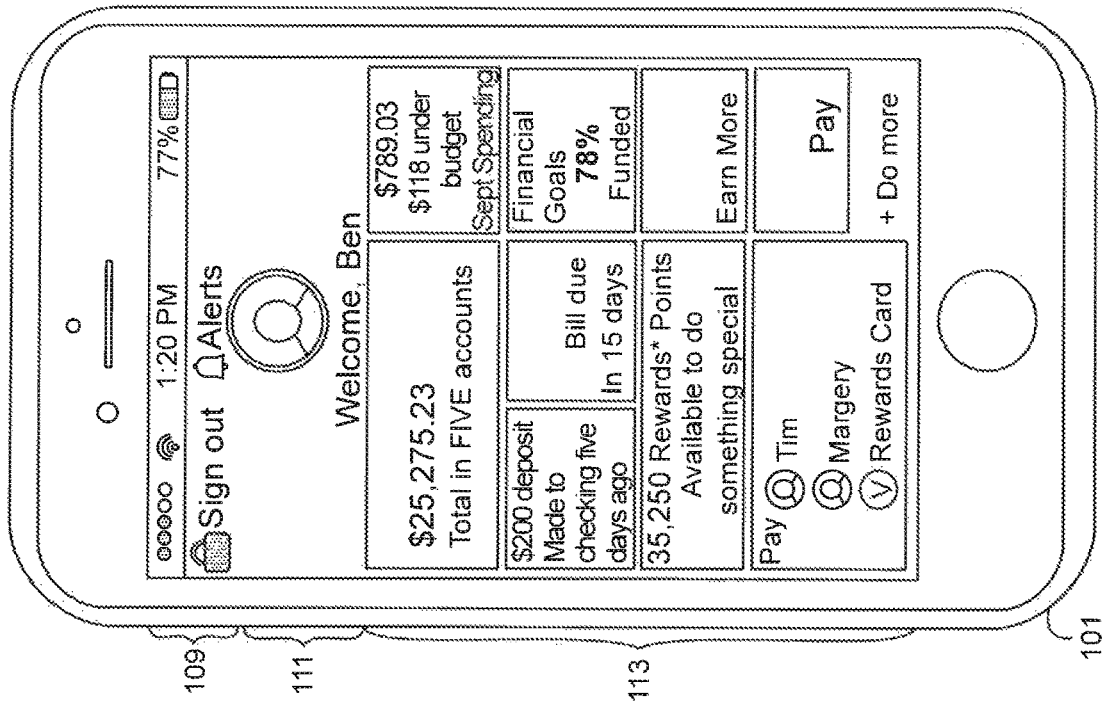
FIG. 1B

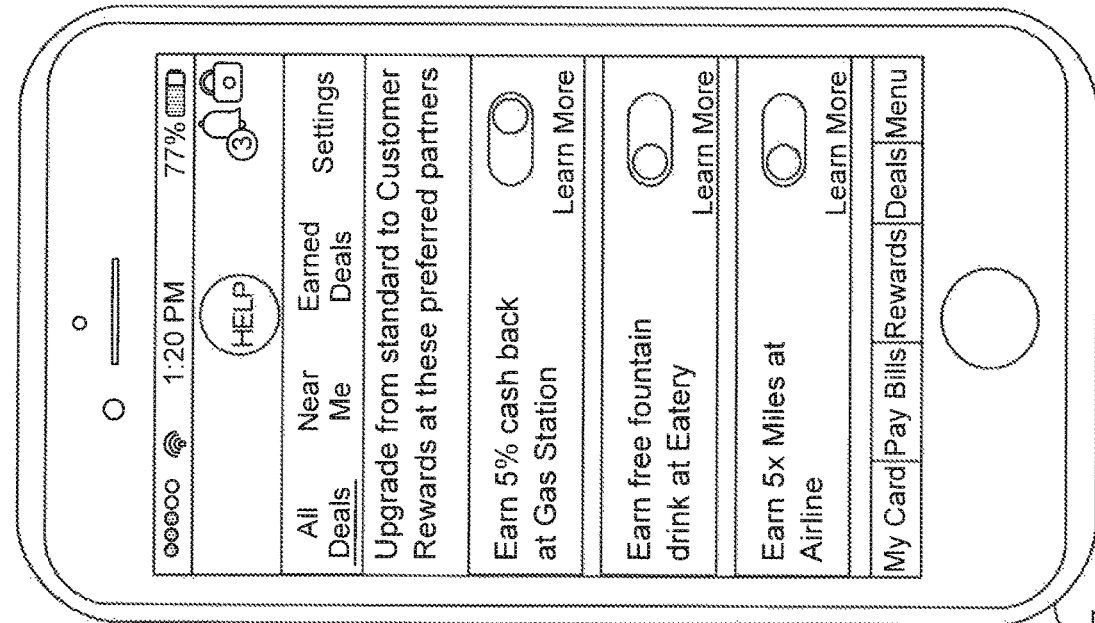
FIG. 1C
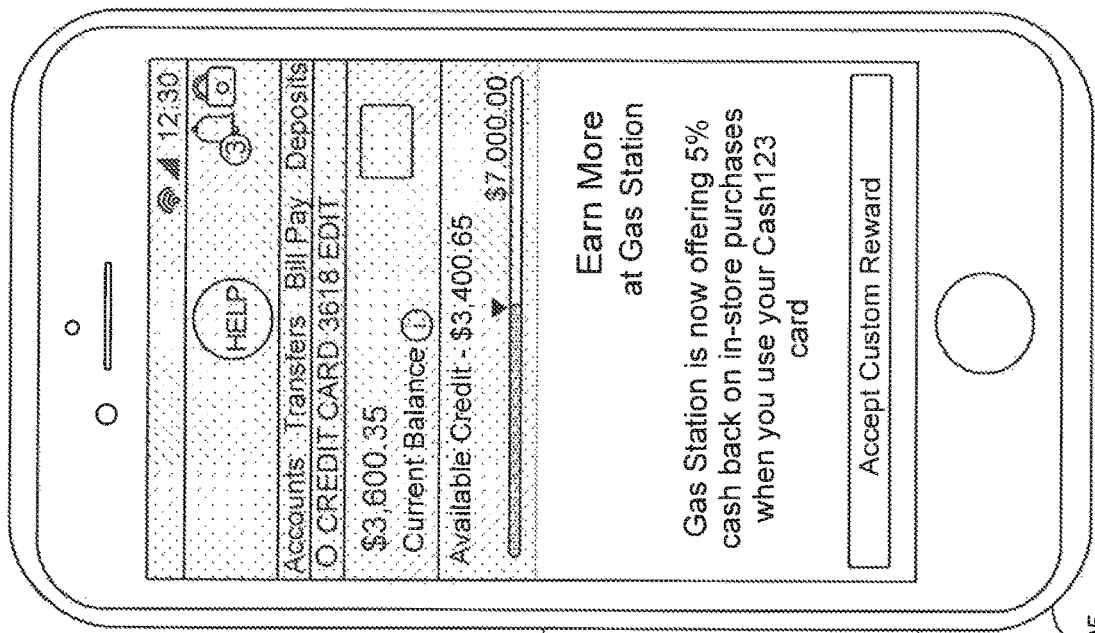

Customer Card Holder — 202
- Value: Greater rewards when shopping at participating Merchants.
- Choice/Control: Select the rewards that best fit their Life Priorities.
- Ubiquity: Card can be used at all card accepting Merchants

Merchant — 204
- Loyalty: Rewards create incentive to shop at Participating Merchants.
- Brand: Brand is presented regardless Customer's rewards selection.
- Message: Merchant controls marketing message and behavior requirements.
- Cost: Converting card acceptance costs to marketing to drive sales.

Issuer — 206
- Loyalty: New innovative product that enriches the Bank Issuer value proposition.
- Connections: Bank Issuer facilitates the Merchant – Customer interaction.
- Cardholder Champion: Create advocacy and drive new Customer acquisition.

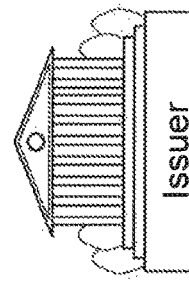

FIG. 2

POS TERMINAL(S) WITH FREE FORM REWARDS ARCHITECTURE

CROSS-REFERENCE TO RELATED APPLICATION

This application is a non-provisional of U.S. Provisional Patent Application No. 62/586,409 filed Nov. 15, 2017 entitled "CUSTOM REWARDS PROTOCOL AND SYSTEM ARCHITECTURE" which is hereby incorporated by reference herein in its entirety.

FIELD OF TECHNOLOGY

This application relates to point-of-sale (POS) terminal credit transactions. Specifically, this application relates to free form rewards architecture for custom rewards credit transactions that are initiated at a POS terminal.

BACKGROUND OF THE DISCLOSURE

In an electronic payment scenario, a customer (the "customer") may purchase from a merchant or service provider ("the merchant") goods or services ("the product") using credit (a "credit transaction"). The purchase may debit an asset account. The credit may be extended to the customer by an issuing bank (the "issuer"). The asset account may reside at the issuing bank or be held by another entity. The merchant may present the transaction to an acquiring bank (the "acquirer"). The acquirer may pay the merchant for (and thus "acquire") the product. A transaction mediator in communication with the issuer and the acquirer may settle the transaction between the issuer and the acquirer.

A credit transaction may incur a plurality of fees. The transaction mediator may set network fees and collect those fees from the issuer and the acquirer in connection with the settlement. The acquirer may collect an interchange fee. The merchant may absorb a cost of acceptance. The cost of acceptance may be a transaction cost passed on for processing the credit card transaction.

A credit transaction may earn the customer a transaction reward in a rewards program. Rewards programs may deepen current customer relationships and attract new customers. Rewards programs may offer customers incentives to use their payment instruments to purchase goods or services from merchants. Illustrative rewards include perks such as upgrades, cash-back, air-lines miles or "points." Points may be utilized to obtain goods or services from qualifying merchants. Customers typically earn points by making qualifying purchases using a payment instrument provided by the issuer.

Typically, rewards programs are funded by the issuer, and do not promote merchant specific spend, brand, or message.

It would be desirable to provide a custom rewards model, in which the rewards may be provided by the merchant. A merchant-funded custom rewards model may allow merchants to control and direct the marketing and loyalty of their brand. Accordingly, it would be desirable to provide apparatus and methods for custom rewards protocols and system architecture.

In a merchant-funded custom rewards model, it may be advantageous to the merchant to formulate and offer free form rewards. Free form rewards may be based on location and customer data. Free form rewards may promote customer behaviors that are gainful to the merchant. Accordingly, it would be further desirable to provide apparatus and methods for a free form rewards model of a merchant-funded custom rewards architecture.

SUMMARY OF THE DISCLOSURE

Methods and apparatus for providing a dual-track point-of-sale (POS) terminal are disclosed. A merchant POS terminal may enable a customer to purchase one or more products from a merchant. The products may include goods and/or services.

The customer may be enabled to link a payment instrument to the POS terminal to initiate a credit transaction for the products. The credit transaction may include a financial entity that is an issuer. The issuer may authorize a purchase. The issuer may also extend payment credit to the customer for an authorized purchase. The issuer may collect a monetary sum from the customer as compensation for the payment credit.

A credit transaction may be processed via a processing network. A processing network may enable the merchant to communicate to the issuer a request for authorization of the credit transaction. The processing network may also enable the issuer to communicate to the merchant a response to the authorization request. The response may be to grant or deny the authorization.

The processing network may settle the credit transaction. Settlement may include debiting the issuer a first monetary amount. The first monetary amount may correspond to the purchase price of the products. At least a part of the first monetary amount may be credited to the merchant as a second monetary amount. The second monetary amount may be the payment the merchant receives for providing the customer with the products. The difference between the second monetary amount and the purchase price of the products in the credit transaction may be a transaction cost incurred by the merchant. The transaction cost may be a cost incurred by the processing network for processing the transaction. The processing network may pass the costs on to the merchant.

A credit transaction may include a transaction reward. A transaction reward may be provided to the customer upon using the payment instrument for a purchase. The transaction reward may be associated with a first value received by the customer, and a second value corresponding to the cost to a rewarder in providing the transaction reward. The first value received by the customer may be a perceived value. The first value may be higher than the second value.

The rewarder of a transaction reward may be associated with a rewards program. In a conventional rewards program, the rewarder may be an issuer. In an MFR rewards program, the rewarder may be a merchant. An MFR rewards model may allow merchants to control and direct the marketing and loyalty of their brand. An MFR reward may be a free form reward. A free form reward may be formulated to provide maximum value to the customer and/or to the merchant.

The dual-track POS terminal may notify the customer of two tracks of rewards offered for a current purchase. A first track may include a default, conventional award. A second track may include an MFR. The MFR may have been formulated by a merchant computer system. The merchant computer system may be a computer system with at least one processor.

The dual-track POS terminal may be configured to receive a customer selection of one of the two tracks of offered rewards. A customer selection of the second track may opt the customer in to the MFR vis-à-vis the current purchase. Opting in to the MFR may terminate, vis-à-vis the current purchase, the customer's default enrollment in the first track of rewards. When the customer completes a purchase while opted-in to the MFR, he or she may receive the MFR transaction reward.

BRIEF DESCRIPTION OF THE DRAWINGS

The objects and advantages of the disclosure will be apparent upon consideration of the following detailed description, taken in conjunction with the accompanying drawings, in which like reference characters refer to like parts throughout, and in which:

FIG. 1B shows illustrative screenshots in accordance with principles of the disclosure;

FIG. 1C shows additional illustrative screenshots in accordance with principles of the disclosure;

FIG. 2 shows an illustrative diagram in accordance with principles of the disclosure;

DETAILED DESCRIPTION OF THE DISCLOSURE

Figure 1A:
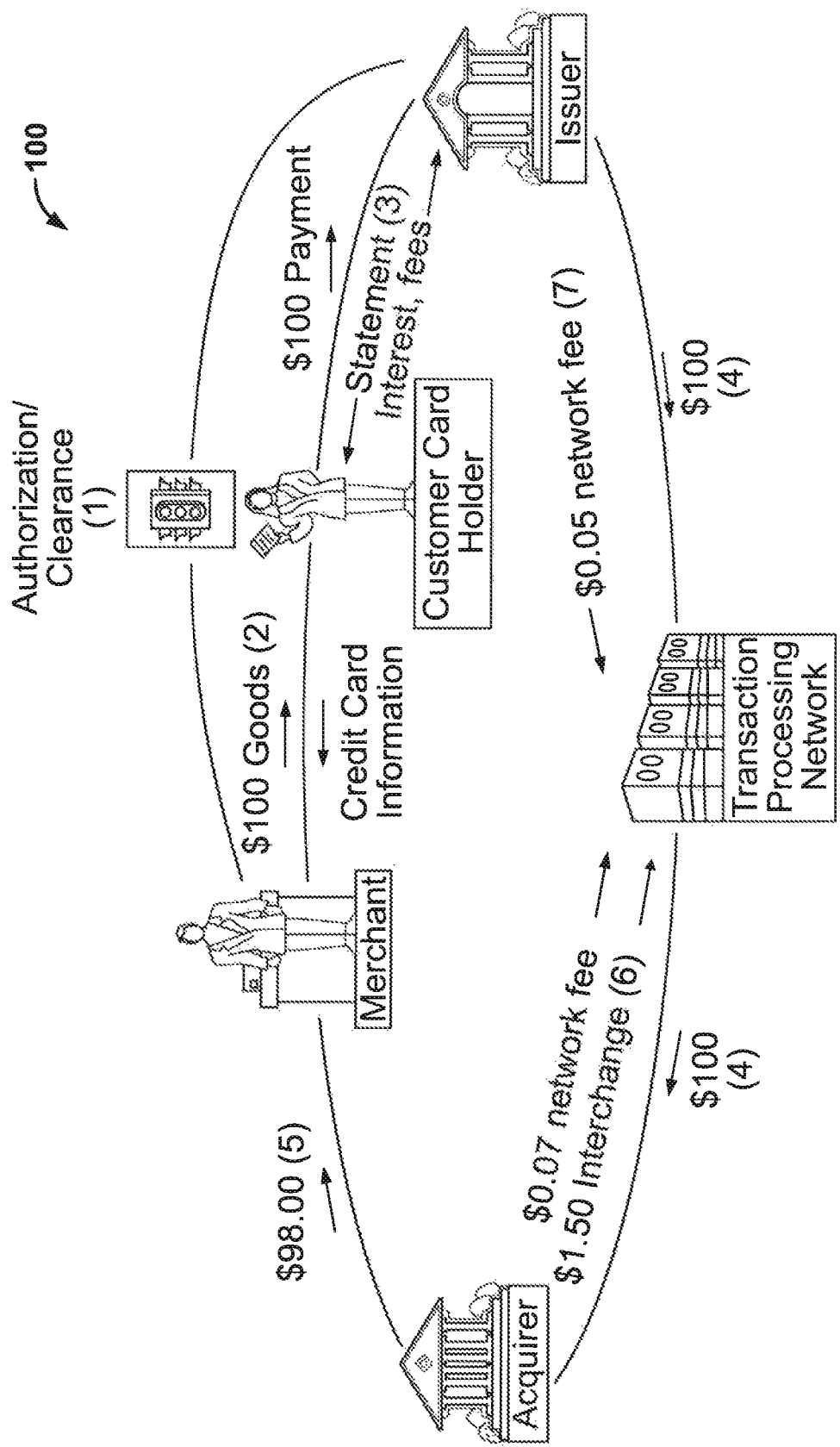
FIG. 1A shows an illustrative system architecture in accordance with principles of the disclosure.

Methods and apparatus for providing a dual-track point-of-sale (POS) terminal are disclosed. A POS terminal may enable a customer to purchase one or more products from a merchant. The products may include goods and/or services.

The customer may be enabled to link a payment instrument to the POS terminal to initiate a credit transaction for the products. The credit transaction may include a financial entity that is an issuer. The issuer may authorize a purchase. The issuer may also extend payment credit to the customer for an authorized purchase. The issuer may collect a monetary sum from the customer as compensation for the payment credit. The monetary sum may equal the purchase price of the product. The monetary sum may include additional applicable fees and interest.

A credit transaction may be processed via a processing network. A processing network may include an acquirer. An acquirer may be a bank associated with the merchant. A processing network may include a transaction mediator. A transaction mediator may enable communication between the acquirer and issuer.

A processing network may enable the merchant to communicate to the issuer a request for authorization of the credit transaction. The processing network may also enable the issuer to communicate to the merchant a response to the authorization request. The response may be to grant or deny the authorization.

The processing network may settle the credit transaction. Settlement may include debiting the issuer a first monetary amount. The first monetary amount may correspond to the purchase price of the products. At least a part of the first monetary amount may be credited to the merchant as a second monetary amount. The second monetary amount may be the payment the merchant receives for providing the customer with the products. The difference between the second monetary amount and the purchase price of the products in the credit transaction may be a transaction cost incurred by the merchant.

A credit transaction may include a transaction reward. A transaction reward may be provided to the customer upon using the payment instrument for a purchase. The transaction reward may be associated with a first value received by the customer, and a second value corresponding to the cost to a rewarder in providing the transaction reward. The first value may be higher than the second value.

The rewarder of a transaction reward may be associated with a rewards program. In a conventional rewards program, the rewarder may be an issuer. In a merchant-funded rewards (MFR) program, the rewarder may be a merchant. An MFR rewards model may allow merchants to control and direct the marketing and loyalty of their brand. An MFR reward may be a free form reward. A free form reward may be formulated to provide maximum value to the customer and/or to the merchant.

The dual-track POS terminal may notify the customer of two tracks of rewards offered for a current purchase. A first track may include a default, conventional award. A conventional award may include airline points. A second track may include an MFR. The MFR may have been formulated by a merchant computer system. The merchant computer system may be a computer system with at least one processor.

The dual-track POS terminal may be configured to receive a customer selection of one of the two tracks of offered rewards. A customer selection of the second track may opt the customer in to the MFR vis-à-vis the current purchase. Opting in to the MFR may terminate, vis-à-vis the current purchase, the customer's default enrollment in the first track of rewards. When the customer completes a purchase while opted-in to the MFR, he or she may receive the MFR transaction reward.

When a customer opts-in to MFR rewards for a transaction, details of the credit transaction processing may be adjusted. An adjustment may include decreasing the transaction cost to the merchant. The decrease in the transaction cost to the merchant may include passing on to the merchant only a portion of costs incurred by processing the transaction. The transaction cost to the merchant may be decreased to compensate for the merchant's funding of the transaction reward. The decreased transaction cost may in turn decrease the profit netted by the issuer. However, the decrease in profit may be counterbalanced by the absence of issuer funded rewards in the MFR model.

In certain embodiments, the system may be configured to execute a part or all of a transaction within a predetermined time frame. In an exemplary embodiment, the authorization of the credit transaction may be completed within a suitable amount of time from when the customer initiates an MFR transaction. The suitable amount of time may be 3, 4, 5, 6 or 7 seconds. The suitable amount of time may be any amount of time after which a customer may become impatient.

In certain embodiments, the system may be configured to formulate offers of MFR transaction awards independent of the initiation of a transaction. For example, the merchant computer system may process a set of MFR rewards for each customer in a database. The processing may occur at predetermined intervals.

The MFR reward offers formulated independently of a transaction may be stored on a database in the merchant computer system. In one embodiment, the MFR reward offers may be communicated to the POS terminal in response to the initiation of a transaction at the POS terminal. In another embodiment, the MFR reward offers may be stored at the POS terminal. Storing the MFR reward offers at the POS terminal may decrease the time it takes for the reward to be offered to the customer in response to the customer initiating a purchase at the POS terminal.

In other embodiments, the MFR transaction awards offered to the customer may be formulated in response to the customer initiating a transaction with a payment instrument at a POS terminal. An advantage of this embodiment may be the elimination of large databases of formulated MFR rewards.

Methods and apparatus for providing a merchant-funded rewards (MFR) payment system are disclosed. The system may include a point-of-sale (POS) terminal. A POS terminal may enable a customer to purchase one or more products from a merchant. The products may include goods and/or services.

The system may include a payment instrument. The payment instrument may enable a customer to initiate a credit transaction at a POS terminal for a purchase. Exemplary payment instruments may include credit cards and smart phones.

A credit transaction may include a financial entity that is an issuer. The issuer may authorize a purchase. The issuer may also extend payment credit to the customer for an authorized purchase. The issuer may collect a monetary sum from the customer as compensation for the payment credit. The monetary sum may equal the purchase price of the product. The monetary sum may include additional applicable fees and interest.

A credit transaction may be processed via a processing network. A processing network may enable the merchant to communicate to the issuer a request for authorization of the credit transaction. The processing network may also enable the issuer to communicate to the merchant a response to the authorization request. The response may be to grant or deny the authorization.

The processing network may settle the credit transaction. Settlement may include debiting the issuer a first monetary amount. The first monetary amount may correspond to the purchase price of the products. At least a part of the first monetary amount may be credited to the merchant as a second monetary amount. The second monetary amount may be the payment the merchant receives for providing the customer with the products. The difference between the second monetary amount and the purchase price of the products in the credit transaction may be a transaction cost incurred by the merchant.

A credit transaction may include a transaction reward. A transaction reward may be provided to the customer upon using the payment instrument for a purchase. The transaction reward may be associated with a first value received by the customer, and a second value corresponding to the cost to a rewarder in providing the transaction reward. The first value may be higher than the second value.

The rewarder of a transaction reward may be associated with a rewards program. In a conventional rewards program, the rewarder may be an issuer. In an MFR rewards program, the rewarder may be a merchant. An MFR rewards model may allow merchants to control and direct the marketing and loyalty of their brand. An MFR reward may be a free form reward. A free form reward may be formulated to provide maximum value to the customer and/or to the merchant.

The system may include a merchant computer system. The merchant computer system may include at least one processor. The merchant computer system may be located at a central merchant headquarters. The merchant computer system may be located in an individual store. The merchant computer system may be located in a POS terminal. The merchant computer system may be distributed over a plurality of devices. The merchant computer system may be a "cloud" based virtual system.

The merchant computer system may be configured to formulate one or more MFR transaction rewards to offer to the customer as an MFR rewards program. The offer may include a qualifying payment instrument, a qualifying POS terminal. The offer may also include details of the transaction reward that the customer earns upon making a purchase with the qualifying payment instrument at the qualifying POS terminal.

The offer may be communicated to at least one notifying device. A notifying device may notify a customer of an available MFR reward. The notifying device may be a computer. The customer may be notified via email on the computer. The customer may be notified with a pop-up message on the computer. The pop-up may be displayed while the customer is navigating a merchant website. The pop-up may be displayed while the customer is navigating a website participating with the merchant.

The notifying device may be a mobile phone. The mobile phone may display the MFR reward offer after it is formulated. The mobile phone may display the MFR reward offer at a predetermined time. The predetermined time may be after a customer reached a threshold level of spending at the merchant. The predetermined time may be when a customer is known to have entered a predetermined location. The location may be a merchant store. The location may be the store of a merchant competitor.

The notifying device may be a POS terminal. The POS terminal may notify the customer of an available MFR reward when the customer initiates a transaction at the POS terminal.

In some embodiments, the POS terminal may be a merchant website or online store being accessed by the customer on a computer device. The payment instrument may be credit card information that is entered at an online checkout. The notifying device may be the costumer's mobile phone. The notifying device may also be the computer itself. For example, the customer may be browsing a merchant's online store. The merchant computer system may recognize the IP address of the customer's computer. If the customer is logged in to an online account, the merchant computer system may recognize the account. The merchant computer system may direct a message to notify the customer of an available MFR reward. The message may be a text message or pushed notification on the customer's mobile phone. The message may also be a pop-up on the computer.

The notifying device may be configured to display the offer to the customer and receive a selection from the customer. A selection may include the opting-in to one or more of the offered MFR transaction rewards. A customer may select to opt-in to an MFR transaction award in or regarding a particular purchase. The customer opting-in may terminate the customer's default enrollment in the conventional rewards program. The termination may only be for the particular purchase. In some embodiments, the termination may be for all purchases at the merchant.

When a customer opts-in to MFR rewards for a transaction, details of the credit transaction processing may be adjusted. An adjustment may include decreasing the transaction cost to the merchant. The transaction cost to the merchant may be decreased to compensate for the merchant's funding of the transaction reward. The decreased transaction cost may in turn decrease the profit netted by the issuer. However, the decrease in profit may be counterbalanced by the absence of issuer funded rewards in the MFR model.

An opted-in customer who makes a purchase with a qualifying payment instrument at a qualifying POS terminal may enable the customer to receive the MFR transaction reward. The MFR transaction may give the customer greater perceived value, at a decreased cost to the merchant. The MFR transaction may provide increased customer satisfaction. The increased customer satisfaction may increase customer spending. Increased customer spending may increase revenue to the merchant and issuer.

The merchant computer system in an MFR rewards system architecture may include a database. The data in the database may be used in formulating one or more of the MFR transaction rewards offered to the customer.

The database may include data regarding customer activity. Customer activity may include customer geolocation data. Customer geolocation data in the database may be updated when a consumer enters a predetermined location. The predetermined location may be a merchant store. The predetermined location may be the store of a competitor to the merchant. For example, when a customer enters a competitor location, the merchant may notify the customer of an MFR reward offer to incentivize the customer to shop at the merchant.

Customer data may include customer spend analysis data. Customer spend analysis data may enable the merchant computer system to determine rewards that may be desirable to the customer. The merchant computer system may be able to use customer spend data to associate a value of a reward to a customer. For example, if a customer routinely purchases a certain item at full list price, the merchant computer system may determine that the item is desired by the customer, and the value received by the customer is the full list price. In another example, a customer may routinely purchase a particular item whenever the item goes on sale below a certain price. The merchant computer system may determine that the item is desirable to the customer, but the value received is the certain sale price.

Customer data may include social media data. Social media data may include indications of products that are desirable to a customer, as well the value the customer associates with the products. For example, a customer may post information on social media which directly or indirectly contain the above indicators.

The database may be configured to include general market data. Market data may indicate products that are desirable to the general public. Market data may also indicate which products may be desirable to particular demographic or psychographic sets of customers. Market data may also associate a value with the desired products. The merchant computer system may use this data in formulating MFR rewards for customers.

The merchant computer database may contain any data suitable for the determination of rewards that may be desirable to a customer, as well as the value to the customer of those rewards. For example, data may indicate that a customer opted to pay an amount of money for expedited or special service. The merchant computer database may derive from the data that the customer desires special service. The merchant computer system may also derive that special service holds a value to the customer at least as great as the amount he or she paid for the special service.

The merchant computer system may be configured to formulate at least one of the offered MFR transaction rewards to incentivize a customer behavior. The incentivized customer behavior may be a behavior that is advantageous to the merchant. The merchant may offer rewards associated with the advantageous behaviors to increase the incidence of customers engaging in the behaviors.

An exemplary customer behavior that may be advantageous to the merchant may include online pre-ordering of products. Another example may include purchasing products from a store whose sales performance is below a predetermined threshold. Yet another example may include purchasing products whose sales performance is below a predetermined threshold. Still another example may include purchasing products at certain times. The certain times may include times during which sales performance is below a predetermined threshold. The certain times may be times of the day. The certain times may also be days of the week, month, or year.

In certain embodiments, the merchant computer system may be configured to execute a process to generate and select MFR rewards to offer to a customer. The merchant computer system may formulate a set of potential MFR transaction rewards. The set may include all the products available to the merchant to offer as a reward. The merchant computer system may then eliminate from the set the MFR transaction rewards that cost the merchant above a threshold cost. The threshold cost may be a predetermined amount or a predetermined percentage of a purchase price of products being purchased. For example, the merchant computer system may eliminate any product with a cost to the merchant more than 1 percent of the purchase price of a qualifying purchase.

The merchant computer system may then calculate, for each MFR transaction award remaining in the set, the customer received value, based on the data in the database. The merchant computer system may then further calculate, for each MFR transaction award in the set, the difference between the first, customer received, value, and the second, merchant cost, value. The merchant computer system may then select the MFR transaction award with the greatest difference between first and second values. The selected MFR transaction award may be communicated to the notifying device to offer to the customer.

In certain embodiments, the MFR transaction awards offered to the customer may be formulated independent of the initiation of a transaction. The merchant computer system may be directed to formulate a set of MFR rewards for a particular set of customers. The merchant computer system may be directed to formulate a set of MFR rewards for an entire database of customers. The merchant computer system may be configured to formulate a set of MFR rewards at predetermined intervals. For example, the merchant computer system may be configured to formulate a set of MFR rewards for all customers every Monday morning at 6 A.M. EST.

A set of MFR rewards that were formulated independent of customer activity may also be notified to the customer on a notifying device independent of customer activity. For example, the merchant computer system may be configured to communicate to the notifying device a set of MFR rewards every Monday morning at 7 A.M. EST.

In certain embodiments, a set of MFR rewards that were formulated independent of customer activity may be notified to the customer on a notifying when the customer initiates a transaction. In other embodiments, a set of MFR rewards that were formulated independent of customer activity may be notified to the customer on a notifying when the customer enters a predetermined location. The predetermined location may be a merchant store. The predetermined location may be the store of a competitor to the merchant.

In certain embodiments, the MFR transaction awards offered to the customer may be formulated in response to the customer initiating a transaction with a payment instrument at a POS terminal. In other embodiments, the MFR transaction awards offered to the customer may be formulated in response to the customer entering a predetermined location.

In certain embodiments, a customer selection to opt-in to an MFR is stored locally at a qualifying POS terminal. In other embodiments, a customer selection to opt-in is stored on the merchant computer system. A POS terminal may be configured to communicate with the merchant computer system when a transaction is initiated. The communication may query the merchant computer system to ascertain whether the transaction qualifies for MFR rewards and/or alternative processing network processing.

In another embodiment, the payment instrument may store information pertaining to MFR rewards. The POS terminal may access the information and process the transaction accordingly. It may be unnecessary for the POS terminal to query the merchant computer system.

Methods and apparatus for electronically processing credit card payments are provided. The method may include formulating, on a merchant computer system processor, a set of merchant-funded rewards (MFR) to offer to a customer. The offer may include a qualifying payment instrument, a qualifying point-of-sale (POS) terminal, and details of the reward. An MFR reward may be a free form reward. A free form reward may be formulated to provide maximum value to the customer and/or to the merchant.

The method may include notifying the customer of the MFR offer via a notifying device. The method may further include receiving a request from a customer to opt-in to the MFR. In response to receiving the request, the qualifying payment instrument of the customer may be linked to the MFR offer. When so linked, the default customer enrollment in a conventional, issuer-bank-funded rewards program may be terminated.

The method may include receiving an authorization request from the merchant to process a transaction initiated by the qualifying payment instrument. The transaction may have been initiated at the qualifying POS terminal. In response to receiving the authorization request from the merchant, it may be detected that the payment instrument is linked to the MFR offer. When it is detected that the payment instrument is linked to the MFR offer, details of the credit transaction processing may be adjusted. An adjustment may include decreasing the transaction cost to the merchant. The transaction cost to the merchant may be decreased to compensate for the merchant's funding of the transaction reward. The decreased transaction cost may in turn decrease the profit netted by the issuer.

However, the decrease in profit may be counterbalanced by the absence of issuer funded rewards in the MFR model.

A customer who makes a purchase with a linked payment instrument at a qualifying POS terminal may receive the MFR transaction reward. The MFR transaction may give the customer greater perceived value, at a decreased cost to the merchant. The MFR transaction may provide increased customer satisfaction. The increased customer satisfaction may increase customer spending. Increased customer spending may increase revenue to the merchant and issuer.

The merchant computer system in an MFR rewards system architecture may include a database. The data in the database may be used in formulating one or more of the MFR transaction rewards offered to the customer.

The database may include data regarding customer activity. Customer activity may include customer geolocation data. Customer geolocation data in the database may be updated when a consumer enters a predetermined location. The predetermined location may be a merchant store. The predetermined location may be the store of a competitor to the merchant. For example, when a customer enters a competitor location, the merchant may notify the customer of an MFR reward offer to incentivize the customer to shop at the merchant.

Customer data may include customer spend analysis data. Customer spend analysis data may enable the merchant computer system to determine rewards that may be desirable to the customer. The merchant computer system may be able to use customer spend data to associate a value of a reward to a customer. For example, if a customer routinely purchases a certain item at full list price, the merchant computer system may determine that the item is desired by the customer, and the value received by the customer is the full list price. In another example, a customer may routinely purchase a particular item whenever the item goes on sale below a certain price. The merchant computer system may determine that the item is desirable to the customer, but the value received is the certain sale price.

Customer data may include social media data. Social media data may include indications of products that are desirable to a customer, as well the value the customer associates with the products. For example, a customer may post information on social media which directly or indirectly contain the above indicators.

The database may be configured to include general market data. Market data may indicate products that are desirable to the general public. Market data may also indicate which products may be desirable to particular demographic or psychographic sets of customers. Market data may also associate a value with the desired products. The merchant computer system may use this data in formulating MFR rewards for customers.

The merchant computer database may contain any data suitable for the determination of rewards that may be desirable to a customer, as well as the value to the customer of those rewards. For example, data may indicate that a customer opted to pay an amount of money for expedited or special service. The merchant computer database may derive from the data that the customer desires special service. The merchant computer system may also derive that special service holds a value to the customer at least as great as the amount he or she paid for the special service.

The merchant computer system may be configured to formulate at least one of the offered MFR transaction rewards to incentivize a customer behavior. The incentivized customer behavior may be a behavior that is advantageous to the merchant. The merchant may offer rewards associated with the advantageous behaviors to increase the incidence of customers engaging in the behaviors.

An exemplary customer behavior that may be advantageous to the merchant may include online pre-ordering of products. Another example may include purchasing products from a store whose sales performance is below a predetermined threshold. Yet another example may include purchasing products whose sales performance is below a predetermined threshold. Still another example may include purchasing products at certain times. The certain times may include times during which sales performance is below a predetermined threshold. The certain times may be times of the day. The certain times may also be days of the week, month, or year.

In certain embodiments, the merchant computer system may be configured to execute a process to generate and select MFR rewards to offer to a customer. The merchant computer system may formulate a set of potential MFR transaction rewards. The set may include all the products available to the merchant to offer as a reward. The merchant computer system may then eliminate from the set the MFR transaction rewards that cost the merchant above a threshold cost. The threshold cost may be a predetermined amount or a predetermined percentage of a purchase price of products being purchased. For example, the merchant computer system may eliminate any product with a cost to the merchant more than 1 percent of the purchase price of a qualifying purchase.

The merchant computer system may then calculate, for each MFR transaction award remaining in the set, the customer received value, based on the data in the database. The merchant computer system may then further calculate, for each MFR transaction award in the set, the difference between the first, customer received, value, and the second, merchant cost, value. The merchant computer system may then select the MFR transaction award with the greatest difference between first and second values. The selected MFR transaction award may be communicated to the notifying device to offer to the customer.

In certain embodiments, the linking of the payment instrument to the MFR offer in response to a customer request in a current transaction is only vis-à-vis the current transaction. In other embodiments, the linking of the payment instrument to the MFR offer, in response to a customer request in a current transaction, becomes the default rewards program for every purchase from the merchant using the payment instrument.

In certain embodiments, the method may include executing a part or all of a transaction within a predetermined time frame. In an exemplary embodiment, authorization of the credit transaction may be completed within a suitable amount of time from when a customer initiates a credit transaction with a linked payment instrument at a qualifying POS terminal. The suitable amount of time may be 3, 4, 5, 6 or 7 seconds. The suitable amount of time may be any amount of time after which a customer may become impatient.

In an electronic payment scenario, a customer (the "customer") may purchase from a merchant or service provider ("the merchant") goods or services ("the product") using credit. The purchase may debit an asset account. The credit may be extended to the customer by an issuing bank (the "issuer"). The asset account may reside at the issuing bank or be held by another entity. The merchant may present the transaction to an acquiring bank (the "acquirer"). The acquirer may pay the merchant for (and thus "acquire") the product. A transaction mediator in communication with the issuer and the acquirer may settle the transaction between the issuer and the acquirer. The transaction mediator may be a whole or part of a transaction network. The transaction network may be a transaction processing network. The transaction mediator may collect fees from the issuer and the acquirer in connection with the settlement.

Settling the transaction may include the transaction network receiving a plurality of transactions from the acquirer. Each of the plurality of transactions may comprise an amount authorized by the issuer. The transaction network may debit an account of the issuer for the amount authorized and credit an account of the acquirer for the amount authorized.

Settlement may include a transfer of funds between two or more transaction participants. The transfer may be a "book transfer," an inter-bank transfer or any suitable transfer between the transaction participants. A settlement network may transfer the funds between the transaction participants. Illustrative settlement networks may include the Federal Reserve Wire Network ("Fedwire") and other suitable settlement networks that are well known to those of ordinary skill in the art. The settlement network may be any suitable network linking one or more accounts of the transaction participants.

One transaction participant may collect a fee from another transaction participant. The fee may include a point-of-sale terminal rental fee, network fees, and any other suitable fees. The fee may be a fixed fee for a transaction. The fee may be a percentage of a transaction. The fee may be a fixed fee and/or a percentage of the transaction.

Transaction networks and associated communication pathways are conventionally constructed to transfer fees from the acquirer, through the transaction processing network, to the issuer. For example, the issuer may transfer to the acquirer a purchase amount of the product, net fees. The collected fees may be used by a transaction participant to cover costs associated with the transaction. Exemplary costs may include acquiring credit customers, servicing credit accounts, providing incentives to retain customers, mitigating fraud, covering customer credit risk, group compensation and other expenses.

The acquirer may deduct fees from the amount that the acquirer pays the merchant in exchange for the product. Such a deduction may be called a "merchant discount." Such a deduction may alternatively be called a "transaction cost," or a "cost of acceptance." The merchant discount may include the acquirer's fee, interchange fee and other expenses.

Transaction processing networks and transaction processing network services are offered under trademarks known to those of ordinary skill in the art. Transaction processing networks may set interchange rates. Issuers may refund or reimburse all and/or a portion of the merchant's cost of acceptance. Interchange rates often depend for each transaction processing network on merchant type and size, transaction processing method, transaction volume and other factors.

Currently, issuers may offer reward programs associated with credit and/or debit payment instruments. Such payment instruments may include credit cards, debit cards, instruments or devices that include a contact chip, such as an ISO14443-compliant contactless chip, or other electronic purchasing devices such as smart phones or tablets (collectively hereinafter, payment instruments). Payment instruments may include payment instrument information stored on a mobile device (e.g., smart phone) or accessible via a mobile device. Illustrative payment instrument information is shown below in Table 2.

TABLE 2

Illustrative Payment Instrument Information

Issuer
Transaction network
Customer name
Expiration date
Card security code ("CSC")
Card verification data ("CVD")
Card verification value ("CVV," "CVV2," "iCVV" or "Dynamic CVV")
Card verification value code ("CVVC")
Card verification code ("CVC" or "CVC2")
Verification code ("V-code")

TABLE 2-continued

Illustrative Payment Instrument Information

Card code verification ("CCV")
Signature panel code ("SPC")
Customer identification number ("CID")
Card account number
Brand
Rewards Program ID
Affinity Rewards programs may deepen current customer relationships and attract new customers. Rewards programs may offer customers incentives to use their payment instruments to purchase goods or services from merchants. Illustrative rewards include perks such as upgrades, cash-back, air lines miles or "points." Points may be utilized to obtain goods or services from qualifying merchants. Customers typically earn points by making qualifying purchases using a payment instrument provided by the issuer.

Typically, rewards programs are funded by the issuer. For example, when a customer uses earned points to obtain goods/services, the issuer may reimburse the merchant for at least a portion of the cost of the goods/services provided to the customer.

Merchants pay fees to the acquirer, including terminal rental fees, network fees and other fees, for processing payment instrument payments. Such fees may include fees imposed by a network. Fees paid by the Merchants may be leveraged to compensate an issuer for accepting a credit risk associated with payment instruments and/or compensate an issuer for other costs associated with administering a card program. The issuer may fund rewards or other programs to promote payment instrument usage.

It would be desirable to design a model and associated electronic payment processing architecture that provides customers with reward-type incentives to use payment instruments, but allows issuer to rebate any fees paid by the merchants and allow merchants to control and direct the marketing and loyalty of their brand. Accordingly, it would be desirable to provide apparatus and methods for custom rewards protocols and system architecture.

Protocols and architecture described herein may implement custom reward programs. A custom reward program may include a merchant-funded rewards program. A merchant may identify one or more rewards it wishes to make available to its customers. For example, an eatery may offer a free drink after a customer has spent a requisite amount of money at the eatery or has dined a threshold number of times at the eatery. The merchant may strategically identify a reward that provides a larger perceived value than an actual cost or price of the reward.

Such rewards may be non-monetary such as upgrades, free items, enhanced service and/or preferred service times. Rewards may include monetary rewards such as cash-back. Rewards may be provided instantly at a POS, applied as an instant statement credit or accrued and redeemed at specified or selected times intervals.

Whatever the reward, it is funded by the merchant. In some embodiments, the reward may be jointly funded by the merchant and the issuer. In some embodiments, the merchant may partner with any suitable party to offer and fund a reward.

In some embodiments, the merchant may provide information about available rewards to the issuer. The issuer may promote the reward to customers (e.g., payment instrument holders). For example, the issuer may display the reward to customers from within an app or online banking portal provided to customers by the issuer.

The merchant may promote the available reward. The merchant may promote the reward in its store locations (online or brick and mortar) using any suitable media or medium. The merchant may display the reward to customers from within an app provided to customers by the merchant.

An app running on a mobile device, such as a smart phone, may push notifications to customers regarding available merchant-funded rewards. When the app is provided by a relatively high profile issuer (e.g., an issuer with many more customers than a merchant), the less visible merchants may be provided access to a top tier mobile app and larger pool of customers than would have typically be available to the merchant.

The merchant may leverage availability of the reward to drive customer traffic to the merchant's locations and products/services. The merchant may leverage the reward to drive customer traffic to slower grossing locations. Merchant funding the reward may, directly or indirectly, promote a payment instrument of the issuer and associated spending on merchant products. The issuer may leverage available rewards to drive customers toward specific payment instruments offered by the issuer and associated with the rewards program.

A customer may be required to affirmatively "opt-in" to a merchant-funded reward program. The customer may opt-in using an electronic platform provided by the issuer or the merchant.

In response to merchant funding of a reward, the issuer may rebate interchange or other fees for transactions involving customers and/or payment instruments that have opted-in or are otherwise associated with a MFR program. The issuer may provide a rebate to the merchant as a way of passing on savings results from merchant funding of rewards.

Such merchant-funded rewards may increase a volume of payment instrument transactions by enabling and allowing merchants to control a substance of the reward, control marketing associated with promoting the reward and reduce merchant cost of acceptance associated with transactions.

However, such a rewards model, while novel and innovative, may be associated with a disruption of traditional electronic payment system architecture.

For example, under the new merchant-funded rewards paradigm, functionality may be required for a customer to choose between standard card reward (e.g., issuer funded rewards) or a merchant-funded reward available from a participating merchant. Functionality would also need to be provided to allow coordination between the issuer and merchant for determining eligibility for rewards and tracking when a reward has been paid out to a customer. This functionality may work with or without participation of the merchant's acquirer.

Such functionality may allow a customer (using a payment instrument) to receive regular product rewards if a merchant-funded reward is not selected or receive regular product rewards if the customer makes a purchase from a merchant that does not participate in the merchant-funded rewards program.

The merchant-funded rewards paradigm may yield reduced cost of acceptance rates for the merchant on purchases associated with activated cards (e.g., customers that have opted-in to a specific reward program offered by the merchant). The paradigm may convert savings on costs of acceptance into directed marketing benefits that may increase sales volume of the merchant. Furthermore, reduced costs of acceptance may be rebated through rebates provided by acquirer to merchant.

The issuer may also derive benefit from partnering with the merchant's promotion of the reward. For example, merchant efforts to promote the rewards also promote the brand, loyalty and purchasing behavior associated with the issuer's purchasing instrument. Such a relationship may provide an economic model that promotes mutually beneficial growth and value.

The customer may also benefit from a merchant-funded reward paradigm. For example, the customer may obtain a reward of greater value (actual or perceived) when the customer selects or "opts-in" to the merchant-funded reward. The customer may also be able to select rewards that better fit their priorities or needs.

By partnering with an issuer, the merchant may link its rewards program to a payment instrument that the customer may use at a variety of merchant locations. The customer benefits from a payment instrument that may be used ubiquitously at different merchant locations in different geographic locations.

The rewards program may also deepen customer loyalty to the merchant and/or issuer. For example, rewards offered by the merchant may be tied to other products or services offered by the merchant. The rewards may include offering the customer faster service or "bonus" products when making what otherwise would have been a routine purchase. Such rewards offered by the merchant may provide an incentive for customers to shop at a participating merchant location to earn and obtain the rewards.

The merchant may benefit by having the merchant's brand promoted as a reward option regardless customer's final rewards selection. The merchant may control marketing messages and behavior requirements delivered to customers. Furthermore, the issuer may promote the merchant's reward using one or more of the issuer's platforms for communication with customers. Additionally, the merchant may benefit by converting savings in card acceptance fees to marketing efforts that may increase sales.

From an issuer's perspective, the custom rewards paradigm provides a new and innovative product that enriches the issuer's value proposition associated with its purchasing instrument products. The issuer may also benefit by acquiring new customers as result of the merchants marketing efforts.

System architecture may include mechanisms whereby merchants can submit rewards options and customers can opt-in to be eligible to earn the rewards alternatives. System architecture may also provide one or more systems that enable deployment of varying fee structure for processing such transactions. The sub-systems may utilize unconventional communication protocols and/or hardware to meet or exceed timing requirements and industry standards associated with processing electronic payments. For example, industry standards may demand that not more than 2-3 seconds elapse from a time a customer swipes a payment instrument at a POS terminal until an authorization response is received from the issuer.

Because merchant-funded rewards may only be available at merchant locations, it may be desirable to determine customer eligibility for such rewards in real time at a POS. It also may desirable to determine customer eligibility for such rewards before the customer approaches a POS. Unconventional communication protocols and/or hardware may, in real-time, determine custom reward eligibility and merchant cost for a transaction.

In some embodiment, the merchant may be credited for transaction processing fees in a batch settlement at predetermined time intervals.

Notifications of rewards availability may be pushed to customer via mobile device apps. Such apps may be provided by the issuer, merchant or any suitable entity. Rewards availability may be determined based on any suitable factor. Illustrative factors include geolocation, spend analysis, market data and/or social media data.

Embodiments may include a rewards market place. Such a market place may include a real-time market where merchants may submit rewards and allowing customers to select rewards that meet their needs. In some embodiment, merchants may be able to view competitor's rewards submissions. Such a market place may provide a platform for real-time competition for customers.

Embodiments may include rewards routing protocols. Such protocols may include mechanisms by which a merchant is notified of a customer's rewards selection. Such a selection may trigger the customer's payment instrument enrollment in an alternative or bypass transaction processing network. The bypass transaction processing network may automatically track customer reward activity and apply appropriate fee schedules. Fee adjustments may include reductions/rebates in transaction costs.

Customer may select reward options such as whether to receive rewards in real-time or accrue rewards eligibility over time. Different rewards may be made available depending on whether the customer selects to accrue rewards or receive them in real-time.

Merchant-funded rewards and corresponding merchant benefits (e.g., transaction cost adjustments) may be tracked at the merchant POS terminal. For example, when a customer who has opted-in to a merchant-funded reward program checks out, fees typically charged to the merchant at the time of the transaction may be reduced or rebated. In some embodiments, the merchant may be responsible for providing systems and architecture for tracking rewards and custom rewards activity. In some embodiments, the issuer may provide systems and architecture for tracking rewards and custom rewards activity. Furthermore, such issuer systems may also track merchant credits for transactions. Credits may be earned by the merchant when a customer uses a payment instrument associated with a merchant-funded reward program. Systems and architecture may include transaction processing network integration to process and track reduced fees.

Embodiments may include integrating merchant credits and/or custom rewards into digital forms of payment other than traditional credit cards. For example, systems and architecture may integrate with a crypto currency marketplace.

Customers may use any preexisting payment instrument deemed eligible by the issuer for a rewards program. The customer may opt-in to a merchant-funded rewards program. In some embodiments, the merchant-funded reward program may be an exclusive rewards program. For example, an opt-in to the merchant-funded reward program may trigger an opt-out of other reward programs. Customers may opt-out of merchant-funded rewards programs at any time. Customers may opt back in to traditional rewards at any time.

To access a merchant-funded rewards program, a customer may use a payment instrument in possession of the customer before the merchant-funded rewards program is rolled out. An issuer may determine eligibility for merchant-funded reward program. The issuer may provide notification of customer eligibility to a merchant in authorization response provided to the merchant.

Apparatus for a real-time, dynamic offer platform is provided. The platform may include a plurality of consumer devices. The platform may include a plurality of merchant devices. The platform may include a virtual display. The virtual display may be displayable on the plurality of consumer devices and/or on the plurality of merchant devices.

One of the merchant devices may transmit a selectable reward option to the platform. The transmission may be processed in real-time. The transmission may be processed using a batch mode processing. The virtual display may be configured to display the transmitted reward option.

The virtual display, displaying the transmitted reward option, may be displayable on the plurality of consumer devices and/or on the plurality of merchant devices. One of the consumer devices may receive a selection of the transmitted reward option. Upon receiving the selection, the consumer device may store the selected reward option.

At a point-of-sale, when the consumer device is used to finalize a purchase associated with the selected reward option, the consumer device may be configured to communicate with the point-of-sale. The communication may include termination of a custom communication exchange. A custom communication exchange may include communication between a consumer device, a merchant, an acquirer and an issuer. The consumer device communicates with a merchant. The merchant then communicates with an acquirer, which in turn communicates with an issuer. Intermediaries may facilitate the communication between the merchant and the issuer. Upon receipt of approval by the issuer, the issuer communicates the approval to the acquirer, and the acquirer communicates the approval back to the merchant. The communication may include generation of an updated custom communication exchange. The communication may include information about transaction economics as well as rewards information, transaction information, accrued benefits overall (total points displayed on the receipt), etc.

In some embodiments, the updated custom communication exchange may be transmitted from the point of sale directly to an issuer. It should be appreciated that, in these embodiments, an acquirer and/or network is removed from the communication exchange and/or the acquirer is replaced with a combined acquirer/issuer. In other embodiments, the updated custom communication exchange may be transmitted from the point of sale to an issuer, via an acquirer.

The updated custom communication exchange may include a revised interchange rate passed on to the merchant by the acquirer. The revised interchange rate may be passed on, by the acquirer, to a merchant associated with the point-of-sale device. The revised interchange rate may be less than an interchange rate included in the initial custom communication exchange.

The updated custom communication exchange may include a purchase price associated with the purchase. The purchase price may be less than a purchase price included in the custom communication exchange. In some embodiments, the selected reward option may be a non-monetary reward. The non-monetary reward may include a free item, a free service and/or a free upgrade. The non-monetary reward may grant the customer access to exclusive products and/or services not available to the general public. The non-monetary reward may include enabling one or more purchases at a preferred shopping time. The non-monetary reward may include any other suitable non-monetary reward. In these embodiments, the purchase price may equal to a purchase price include in the custom communication exchange. Therefore, in order to communicate the selected reward option to the issuer, a selected reward option complete tag may be associated with the updated custom communication exchange.

The updated custom communication exchange may include a reward tag. The reward tag may be associated with the purchase of the item. The reward tag may be reset to zero from a non-zero value included in the custom communication exchange. The zero value may trigger removal of the purchase from a points eligibility list.

The updated custom communication exchange and/or the custom communication exchange may include interchange information, other economic information, reward information, transaction information, accrued benefits total and any other suitable information. In some embodiments, the accrued benefits total or total points accrued for a specific card product may be displayed on a receipt on the customer.

The platform may be configured so that each merchant device may update offers, transmit additional offers and/or remove offers in real-time.

In some embodiments, the plurality of consumer devices may be a first plurality of consumer devices. The first plurality of consumer devices may be a second plurality of consumer devices. A consumer device included in the first plurality of consumer devices may be configured to share at least one selectable reward option with a subset of the second plurality of consumer devices. The subset may be a predefined subset. The subset may be distinct for each consumer device. The subset may be defined by the consumer device.

The consumer devices included in the subset may be configured to receive like and/or dislike comments to shared reward offers. The like and/or dislike comments may be displayed on the virtual display of the consumer devices included in the subset. The consumer devices included in the subset may be configured to receive a selection of the shared offers.

A method for rerouting a communication from a first network to a second network is provided. The first network may include a merchant. The merchant may be in communication with an acquirer. The acquirer may be in communication with an issuer. The second network may include at least one merchant. The merchant may be in direct communication with the issuer independent of communication with an acquirer. The second network may include one or more intermediaries to facilitate the communication.

The method may include receiving a selectable reward option at an offer platform. The reward option may be received from a merchant device. The merchant device may be included in a plurality of merchant devices.

The method may include displaying the reward option on a virtual display. The virtual display may be displayable on the plurality of merchant devices and on the plurality of consumer devices. The method may include receiving a selection of a selectable reward option from a consumer device. The method may include storing the selected reward option on the consumer device. The method may include storing the selected reward option on the offer platform.

The method may include receiving a request for a purchase communication at a point-of-sale associated with the merchant. The purchase communication may be associated with the selected reward option. Upon receipt of the request, a rerouting of the purchase communication via the second network may be triggered. The method may include transmitting the purchase communication directly from the merchant to the issuer via the second network. It should be appreciated that fees for use of the second network may be less than fees charged for use of the first network. The second network may be associated with reduced or rebated network fees and/or reduced/rebated acquiring fees. Such fee reductions or rebates may be applied to compensate the merchant for providing customers with custom reward programs. In addition to reductions or rebates of specific transaction fees, other economic incentives may be applied.

In some embodiments, each selectable reward option may include a reward metadata file. The reward metadata file may include information such as geographic location information, target age information, market data, target income bracket and/or any other suitable information. In these embodiments, each consumer device may include a dynamic consumer metadata file. The dynamic consumer metadata file may include information such as current geographic location information, age information, spend trends and analysis, income information, social media data and/or any other suitable information. The dynamic consumer metadata file may be updated when a consumer enters a predetermined location. The location may be a shopping center. A consumer associated with the consumer device may enable and/or disable the updating of the dynamic consumer metadata file.

A processor may determine which reward options are relevant for which consumer devices based on a correlation value between the dynamic consumer metadata file and the reward metadata file being greater than a predetermined correlation value. The display of each consumer device may be configured to display the reward options that are determined to be relevant.

A system for offering rewards is provided. A reward may be provided by a merchant. The merchant may offer rewards based on location. A merchant may offer rewards that are specific to customer behavior. Such customer behavior may include geolocation, spend analysis, market data and social media data. Merchant may also create rewards that promote specific customer behavior. Such specific customer behavior may include online pre-ordering of services and/or products. Such specific customer behavior may include purchasing specific items.

Merchants may use the merchant-funded reward to steer or direct a desired customer behavior. For example, a merchant may provide a reward only if a customer uses a self-service check-out kiosk. A merchant may provide a reward only if a customer orders ahead with his/her mobile device. A merchant may provide a reward only if a customer shops within a desired department within a shop. A merchant may provide a reward only if a customer shops at a specific merchant location. A merchant may modify rewards in order to promote specific customer behavior at different locations, different seasons, various times of day or any other reason.

A new card product may offer merchant-funded rewards and reduce costs for the merchant. This may be the exclusive reward associated with this card. This card may be promoted by merchants because the card is associated with a lower net merchant discount. In some embodiments, custom rewards can be used to enhance an already existing card product offered by an issuer. For example, card products offered by the merchant may be eligible for opting into a custom rewards program or retaining an association with other rewards programs. In such embodiments, the other rewards programs may be the default rewards programs associated with the card product. In other embodiments, custom rewards may be the default rewards program and customer may opt-out of custom rewards and opt into another rewards program. In other embodiments, custom rewards may be the exclusive rewards program for a card product.

A custom rewards network may be used to handle custom reward products, such as the new card product. Using the custom network, network and/or acquirer fees may be lowered by avoiding traditional network fees. Customers may opt-in to merchant-funded rewards. Upon customer opt-in, a shift may be triggered to the custom rewards network. Rewards may be offered at the point-of-sale. If a customer accepts, the transaction may be rerouted to the custom rewards network.

A social media platform may be created around the custom rewards network and/or card product. Cardholders may be able to share offers, receive offers and like and/or dislike offers on the social medial platform. It should be appreciated that the social media platform may extend to non-cardholders as well. Cardholders may be able to share offers with non-cardholders. This may encourage the non-card holders to apply for the new card.

A real-time market may be instantiated. The real-time market may enable merchants to offer customers a variety of reward choices. Customers may select rewards that meet their respective needs. Merchants may be able to view competitor's reward bids. The marketplace may create real-time competition for cardholder business.

Apparatus and methods described herein are illustrative. Apparatus and methods in accordance with this disclosure will now be described in connection with the figures, which form a part hereof. The figures show illustrative features of apparatus and method steps in accordance with the principles of this disclosure. It is understood that other embodiments may be utilized, and that structural, functional, and procedural modifications may be made without departing from the scope and spirit of the present disclosure.

FIG. 1A shows typical credit card transaction settlement flow 100. Flow 100 involves transaction participants such as the merchant, the customer, and transaction service providers that are identified below. At step 1, the merchant provides information, relating to a proposed transaction between the merchant and a customer, to a transaction authorization and clearance provider. The transaction authorization and clearance provider may be a transaction processing network. The transaction authorization and clearance provider may provide transaction authorization and clearance information to the merchant. The transaction authorization and clearance information may include authorization for the transaction to proceed.

At step 2, the merchant provides $100 in product to the customer. The customer pays with a credit card. At step 3, the issuer transmits to the customer a statement showing the purchase price ($100.00) due. The issuer collects the purchase price amount, along with interest and fees if appropriate, from the customer. At step 4, the issuer routes the purchase price amount ($100.00) through the transaction processing network to the acquirer. At step 5, the acquirer partially reimburses the merchant for the purchase price amount. In the example shown in FIG. 1*a*, the partial reimbursement is $98.00. The difference between the reimbursement amount ($98.00) and the purchase price amount ($100.00) is a two dollar ($2.00) transaction cost.

At step 6, the acquirer transfers an interchange amount ($1.50), to the transaction processing network. At step 7, both the acquirer and the issuer pay a transaction processing network fee ($0.07 for acquirer and $0.05 for the issuer) to the transaction processing network.

TABLE 1

Net positions, by participant, based on
settlement flow 100 (shown in FIG. 1A).

| Participant | Net ($) |
|---|---|
| Issuer | (Interest + fees) − 0.05 |
| Acquirer | 0.43 |
| Transaction processing network | 0.12 |
| Merchant | −2.00 |
| Customer | 0 |

In settlement 100 (shown in FIG. 1A), the transaction fee is based on an exemplary merchant discount rate of 2%. The $1.50 interchange is based on an exemplary interchange rate of 1.5%. The interchange rate is typically set by the transaction processing network. The sum of the transaction processing network fees ($0.07 and $0.05) is based on a total exemplary transaction processing network fee rate of 0.12%.

FIG. 1B shows a device presenting an illustrative offer platform. The offer platform may include one or more than one user interface, such as graphic user interface (GUI) 101 and/or GUI 103.

GUI 101 and/or GUI 103 may include one or more platform features. The platform features may include one or more "widgets", windows, virtual tabs, virtual buttons and/or virtual toggle switches.

GUI 101 may include a dashboard view. GUI 101 may include a welcome screen. GUI 101 may include features 109, features 111, and/or features 113.

Features 109 may enable logging into or out of one or more than one platform account. Features 109 may enable accessing of platform information, such as account alerts and/or notifications. Features 109 may enable accessing support and/or help information.

Features 111 may include the welcome screen. Features 111 may include one or more indications identifying the account(s). Features 111 may include photo(s) of one or more than one user associated with the account(s). Features 111 may include a name(s) and/or username(s) of the user(s).

Features 113 may present general account information associated with the account(s). Features 113 may facilitate accessing the account(s). Features 113 may facilitate transaction(s) with one or more third parties. Features 113 may facilitate accessing of GUI 103.

GUI 103 may include an account screen. GUI 103 may include detailed information associated with one or more of the account(s). GUI 103 may include features 115 and/or features 117. Features 115 may enable logging into or out of the account(s). Features 115 may enable accessing of additional account information, such as account alerts and/or notifications. Features 115 may enable accessing support, customer service and/or help information.

Features 117 may include detailed account data, such as account history and/or upcoming account events. Features 117 may facilitate making one or more payments to the account and/or updating account information. Features 117 may facilitate accessing of GUI 101.

FIG. 1C shows the device presenting an illustrative custom offer platform. The custom offer platform may include one or more than one user interface, such as GUI 105 and/or GUI 107. GUI 105 and/or GUI 107 may include one or more of the platform features described in connection with FIG. 1B.

GUI 105 may include one or more than one of the features described in connection with GUIs 101 and 103. GUI 105 may include proactive "shadow box" 119. Shadow box 119 may include one or more than one pop up window. Shadow box 119 may present one or more than one custom merchant reward offer associated with one or more than one payment instrument. Shadow box 119 may include general and/or detailed information regarding the offer(s). Shadow box 119 may include one or more than one of the features configured to facilitate accepting and/or registering for the offer(s).

Shadow box 119 may be configured to be presented in response to a triggering event. The event may include detected proximity of the user to a geographic location. The location may be associated with the offer, such as a location of a merchant presenting the offer. The event may include a detected purchase by the user associated with the offer, such as a purchase of a similar or related product and/or service. Presentation of shadow box 119 may be over GUI 103. The event may include activation of one or more of the features of GUI 101, GUI 103 and/or GUI 107.

Upon presentation of GUI 105, shadow box 119 may occlude one or more than one portion of GUI 103. Upon presentation of GUI 105, one or more than one remaining portion of GUI 103 may be shaded and/or inaccessible until removal of shadow box 119.

GUI 107 may include a customer rewards screen. GUI 107 may include some or all of the features described in connection with GUIs 101, 103 and 105. GUI 107 may present general information regarding one or more reward offers. GUI 107 may include one or more features for accepting and/or rejecting the offers, such as features 121, 123 and 125.

GUI 107 may include one or more "Learn More" buttons. Selecting a "Learn More" button may link to and/or take a user to a website, application, or other applicable medium where the merchant may promote the merchant brand, message, and/or reward value. Information accessed through selecting a "Learn More" button may increase a user's likelihood of opting-in to merchant-funded rewards.

FIG. 2 shows an illustrative chart 200 showing the values received by a customer 202, a merchant 204 and a bank issuer 206 when using a merchant-funded rewards program. Customer 202, merchant 204 and bank issuer 206 may all benefit from having the capability of opting in to an MFR at a point-of-sale.

When using the merchant-funded rewards program, customer 202 may receive rewards that are greater in value than the standard rewards. Customer 202 may select the rewards that best fit their life priorities. Customer 202 may use the payment instrument at all merchants that accept the payment instrument.

Merchant 204 may benefit from participating in the merchant-funded rewards program. Providing merchant-based rewards may incentivize the customer to shop at participating merchants. Offering rewards and displaying the rewards in real-time to the customer may market the merchants brand regardless of whether the customer opts-in to the merchant-funded rewards program. In a merchant-funded rewards program architecture, merchant 204 may control its marketing message and behavior requirements. Merchant 204 may convert the card acceptance costs to marketing in order to drive sales.

Bank issuer 206 may benefit from participating in the merchant-funded rewards program. Bank issuer 206 may not lose out by participating with the merchant-funded rewards program. New innovative products of a merchant may enrich the bank issuer value proposition. Bank issuer 206 may gain from the direct interaction between the merchant and the issuer, thereby increasing sales while using a specific issuer-based card product. Bank issuer 206 may facilitate the merchant-customer interaction. Bank issuer 206 may create advocacy and drive new customer acquisition.

Figure 3:
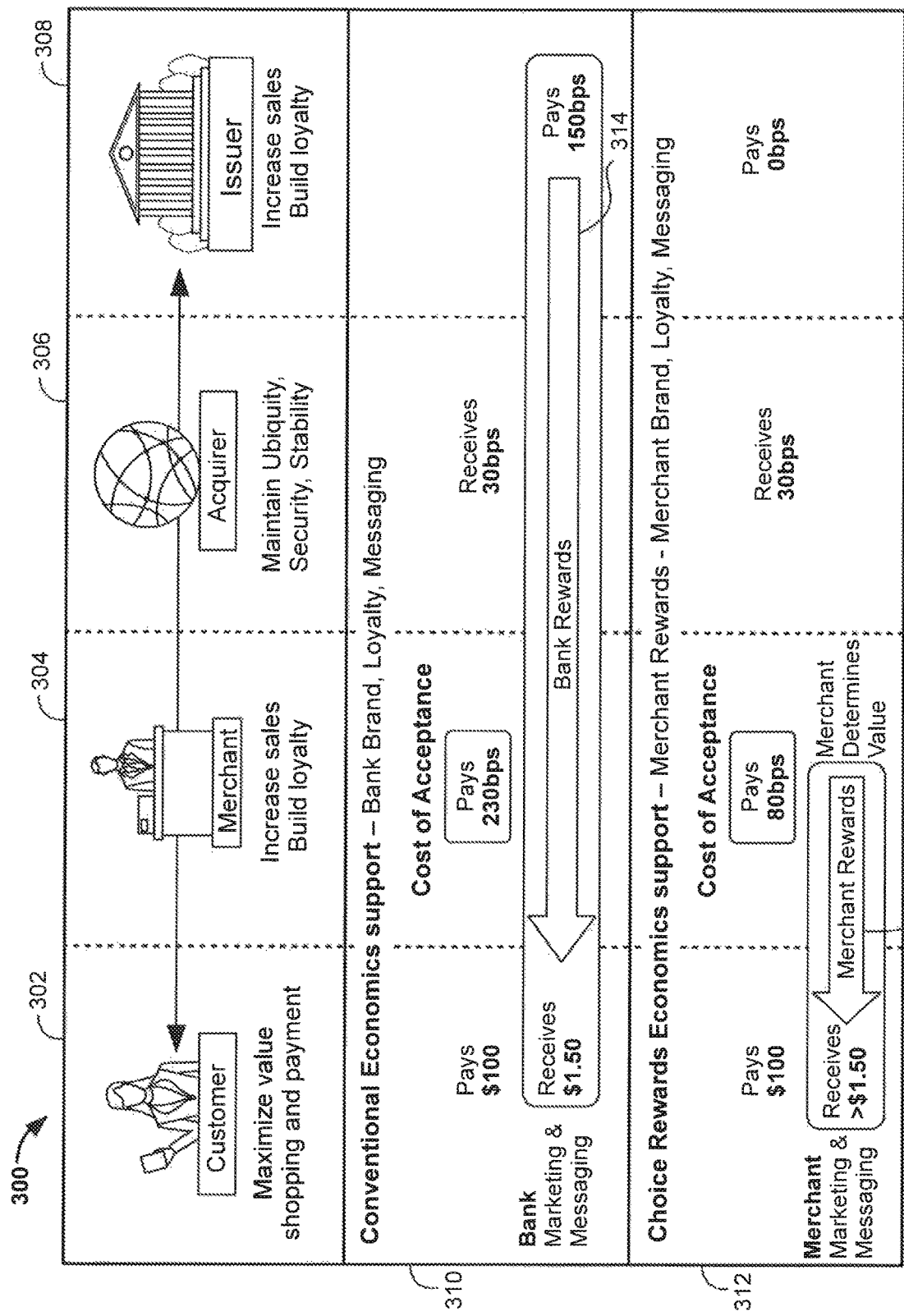
FIG. 3 shows another illustrative diagram in accordance with principles of the disclosure.

FIG. 3 shows an illustrative pictorial diagram 300 showing the values paid and received by a customer, merchant, acquirer/network and issuer when using an offer platform. Column 302 represents the values paid and received by a customer. The customer may seek to maximize value in his or her shopping and payments. Column 304 represents values paid and received by a merchant. A merchant may seek to increase sales and build loyalty. Column 306 represents values paid and received by an acquirer/network. An acquirer/network may maintain security, stability, and ubiquity of credit transactions. Column 308 represents values paid and received by an issuer. An issuer may seek to increase sales and build brand loyalty.

In diagram 300, row 310 represents values associated with a credit transaction using a conventional rewards system. A conventional rewards system may be funded by the issuer. The economics of the conventional rewards system may support the issuer bank brand, customer loyalty, and messaging to an issuer bank customer base. Row 312 represents values associated with a credit transaction using a merchant-funded rewards system. The economics of a merchant-funded rewards system may support the merchant brand, customer loyalty, and messaging to a merchant customer base. The following paragraphs describe the transactions shown in each row.

The current paragraph describes the transaction shown in row 310. The customer in column 302 may link a payment instrument to a POS terminal to initiate a purchase. The purchase price may be $100. The cost of acceptance of the credit transaction may be the transaction cost incurred by the merchant. The cost of acceptance is represented in column 304. In the example shown, the merchant may pay 230 basis points (bps). One bps corresponds to 0.01 of a percent. In the example shown, the merchant may pay $2.30 as a transaction cost. 30 bps from the transaction cost, which is $0.30 in the example of row 310, is received by the acquirer/network, shown in column 306. 150 bps, which is $1.50 in the example of row 310, is paid by the issuer as a bank reward 314, shown in column 308. Reward 314 is received by the customer, as shown in column 302.

The current paragraph describes the transaction shown in row 312. The customer in column 302 may link a payment instrument to a POS terminal to initiate a purchase. The purchase price may be $100. The cost of acceptance of the credit transaction may be the transaction cost incurred by the merchant. The cost of acceptance is represented in column 304. In the example shown, the merchant may pay 80 basis points (bps). One bps corresponds to 0.01 of a percent. In the example shown, the merchant may pay $0.80 as a transaction cost. 30 bps from the transaction cost, which is $0.30 in the example of row 312, is received by the acquirer/network, shown in column 306. In certain embodiments, the 30 bps cost received by the acquirer/network may be lowered and/or refunded. The issuer may not pay any value in rewards. The merchant, shown in column 304, may pay the merchant reward 316 directly to the customer. The reward 316 may be designed so that the cost to the merchant is less than the perceived value of the reward to the customer. In the exemplary transaction of row 312, the merchant may offer a reward that costs less than $1.50, yet is valued by the customer at greater than $1.50. The total transaction cost to the merchant is then less than the $2.30 transaction cost of row 310. Furthermore, the reward 316 received by the customer, shown in column 302, may be greater in row 312 than the $1.50 received in row 310.

Figure 4:
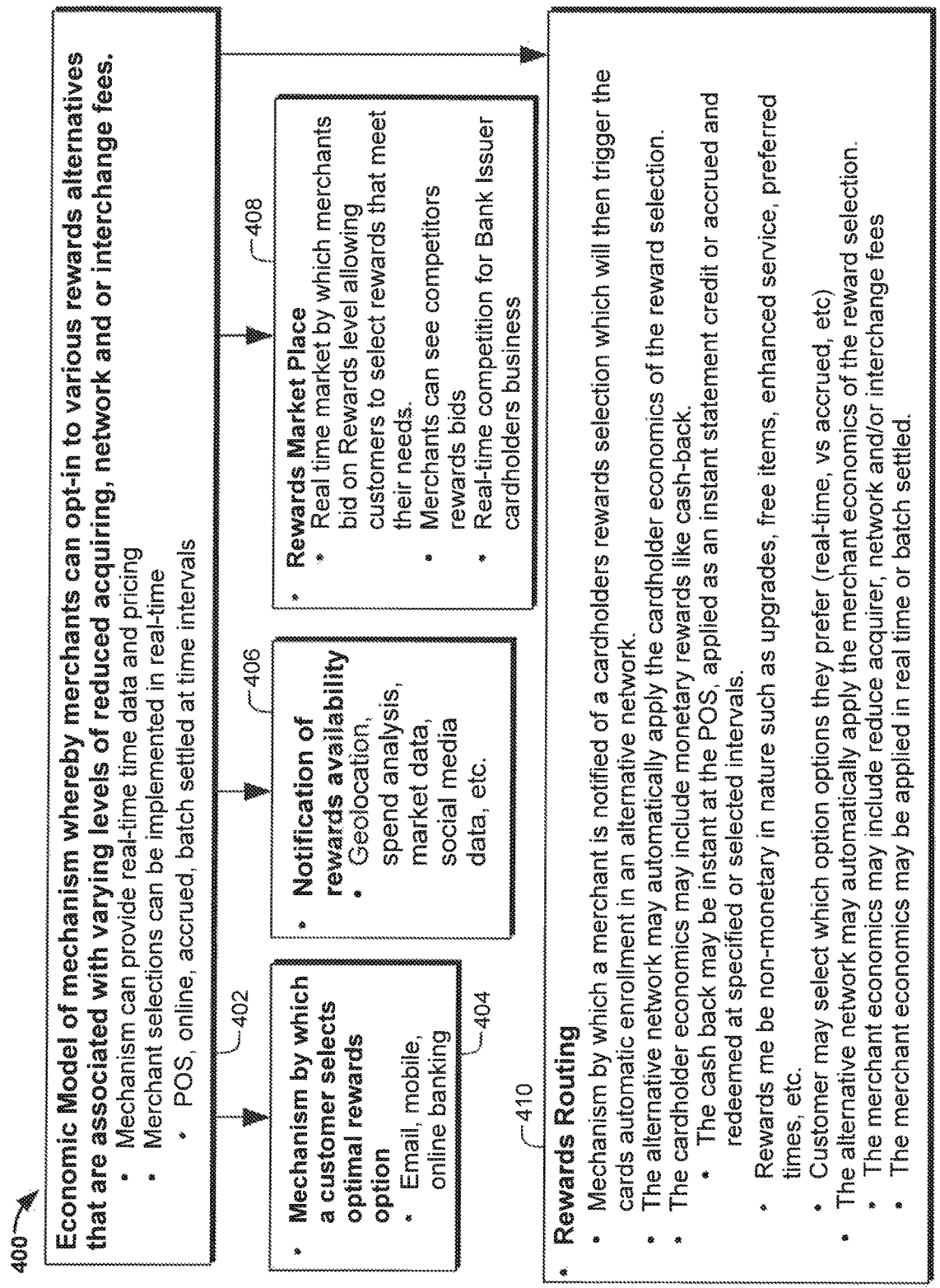
FIG. 4 shows yet another illustrative diagram in accordance with principles of the disclosure.

FIG. 4 shows an illustrative outline 400 showing various models which can be used with the merchant-funded rewards offer platform. At 402, a high-level description of the various rewards alternatives used in connection with a pre-existing payment instrument is portrayed. Merchant-funded rewards architecture may be a mechanism whereby merchants can opt-in to various rewards alternatives that are associated with varying levels of reduced/rebated acquirer and/or network fees. Mechanism may provide real-time data and pricing. Merchant selections may be implemented in real-time. They may be implemented at a POS terminal. They may be implemented online. They may be accrued and/or batch settled at time intervals.

At 404, mechanisms by which a customer may select optimal rewards options is described. A customer may select reward options via email, mobile and/or online banking.

At 406, notification-types of the rewards availability is described. The notification-types may be geolocation, spend analysis, market data and or social media data.

At 408, a rewards market place is described. The rewards market place may be a real-time market by which merchants may bid on a rewards level. The rewards level may enable customers to select rewards that meet their needs and/or standards. Rewards market place enables merchants to see competitor's rewards bids. Rewards market place may enable real-time competition for bank issuer cardholders' business.

At 410, mechanisms for routing of the rewards are described. When a merchant is notified of a cardholder's rewards selection, the cards automatic enrollment in an alternative network may be triggered. The alternative network may automatically apply the cardholder economics of the reward selection. The cardholder economics may include monetary rewards. The monetary rewards may include cash-back rewards. The cash back may be instant at the POS. The cash back may be applied as an instant statement credit or accrued and redeemed at specified and/or selected intervals.

Rewards may be non-monetary in nature. For example, rewards may be upgrades, free items, enhanced service and/or preferred service times. Mechanisms may allow customers to select which options they prefer. Options may include real-time or accrued rewards. The alternative network may apply a merchant's economic model to the reward selection. The economic model may include reduced (or rebated) acquirer and/or network fees. The reduction or rebate may be based on the reward offered by the merchant to a customer. The merchant selection of a reward to offer the customer may be based on the magnitude of the reduction. An economic model may be applied in real-time or may be batch settled.

Figure 5:
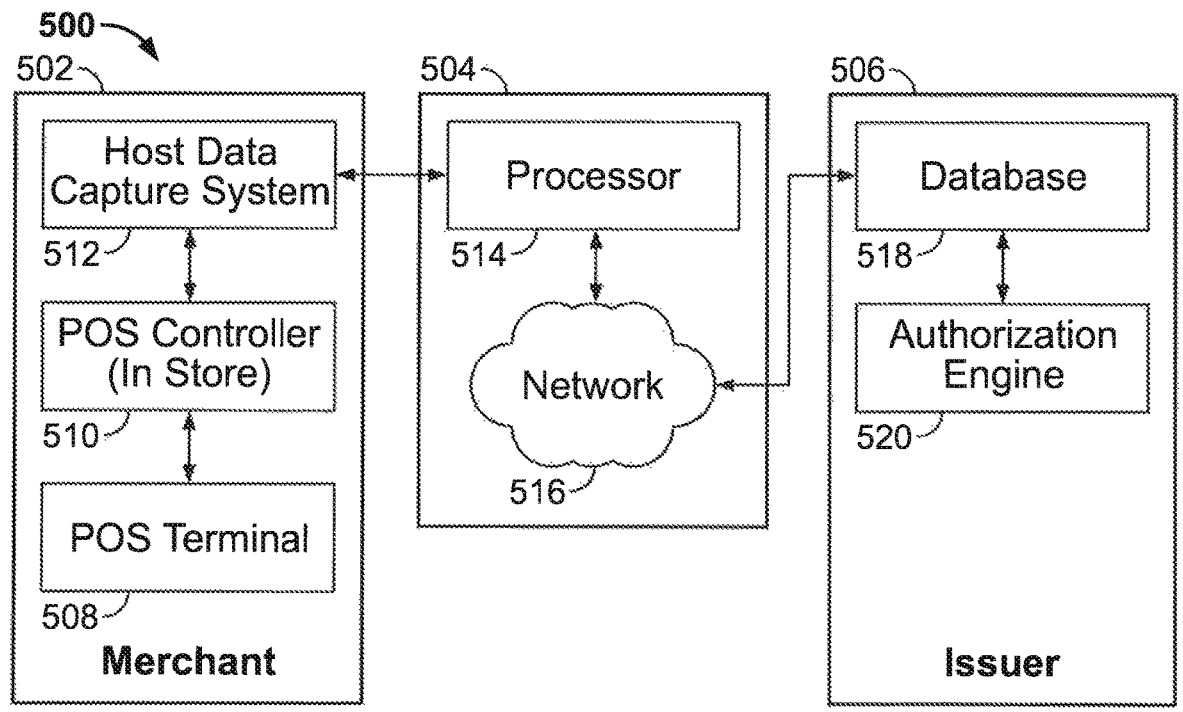
FIG. 5 shows an illustrative system in accordance with principles of the disclosure.

FIG. 5 shows illustrative system 500 for processing and communicating transaction cost information. System 500 may include merchant component 502, network component 504 and issuer component 506. In general, a system such as 500 may include many merchant components such as 502, many issuer components such as 506 and many network components such as 504.

A customer may purchase goods by transferring customer information from a personal data storage device, such as a credit card, to point-of-sale ("POS") terminal 508. POS terminal 508 may read the customer information from the card. The card may store data in a magnetic strip, a bar code, a silicon chip or any other suitable data storage device or format.

The customer information may include issuer information, account information and any other suitable information.

POS terminal 508 may transmit transaction information to POS controller 510. The transaction information may include some or all of the customer information and any other suitable information, such as the transaction amount, information regarding the purchased goods and one or more values associated with the transaction.

POS controller 510 may act as a server for providing user prompts and display layout information to one or more POS terminals such as POS terminal 508. POS controller 510 may receive transaction information from one or more of the POS terminals.

POS controller 510 may transmit transaction information to host data capture system 512. Host data capture system 512 may store transaction information from POS controller 510. Host data capture system 512 may store accounting data, inventory data and other suitable data that may be included in the transaction information.

The transaction information may include information about the merchant, the merchant's business, the merchant's network membership, the merchant's business behavior and any other suitable information. Transaction information may include some or all of the information that is necessary to identify reward eligibility. Rewards eligibility may depend on factors, such as customer spend rate, purchasing behavior, time/date, geolocation, network rates, merchant type, merchant size, transaction processing methods and costs, and any other suitable factors. Transaction information may include one or more of the foregoing factors and any other suitable factors.

The transaction information may be stored in any suitable element of merchant component 502, network component 504 and issuer component 506. For example, transaction cost information may be stored in processor 514. Processor 514 may include algorithms that may be used in conjunction with the transaction cost information to identify a custom reward for a customer transaction taking place at POS terminal 508.

For example, the merchant may offer different rewards to different customers. Offered rewards may depend of what the customer typically purchases (at the merchant or other merchants). After a reward is identified, processor 514 may transmit the reward, via merchant components 502, to POS controller 510.

Host data capture system 512 may be configured to determine eligibility for a reward or rewards program. Host data capture system 512 may track earning and spending of rewards associated with a payment instrument. POS controller 510 may be configured to determine eligibility for a rewards program and/or the earning or spending of rewards.

POS terminal 508 may have one or more interactive features that the customer may use. The features may provide the customer with information that may help the customer decide whether to execute the transaction. The customer may use the features to obtain more information about the merchant, the transaction, a reward, a rewards program, costs associated with different payment instruments, or any other suitable information.

Host data capture system 512 may route the transaction record to processor 514. The illustrative systems shown in FIGS. 5 and 6 may include one or more other processors that perform tasks that are appropriate for the components thereof.

Processor 514 may route the transaction record, via network 516, to database 518. Network 516 may be a default transaction processing network. Network 516 may be a bypass transaction processing network. The routing may be governed by the transaction information or rewards eligibility. For example, eligibility for a rewards program may be associated with a bank issuer number ("BIN") that is encoded in the customer's payment instrument. Authorization engine 520 may render a transaction authorization decision based on the transaction information.

Authorization engine 520 may transmit authorization information back to POS terminal 508 through network 516, processor 514, host data capture system 512 and POS controller 510. The authorization information may include the authorization decision (e.g., "GRANTED" or "DENIED"). The authorization information may include some or all of the transaction information or rewards information (e.g., specific rewards, eligibility or rewards accrued). The transaction information may be used by processor 514 to route the authorization information back to the merchant and the POS terminal where the customer is present.

Figure 6:
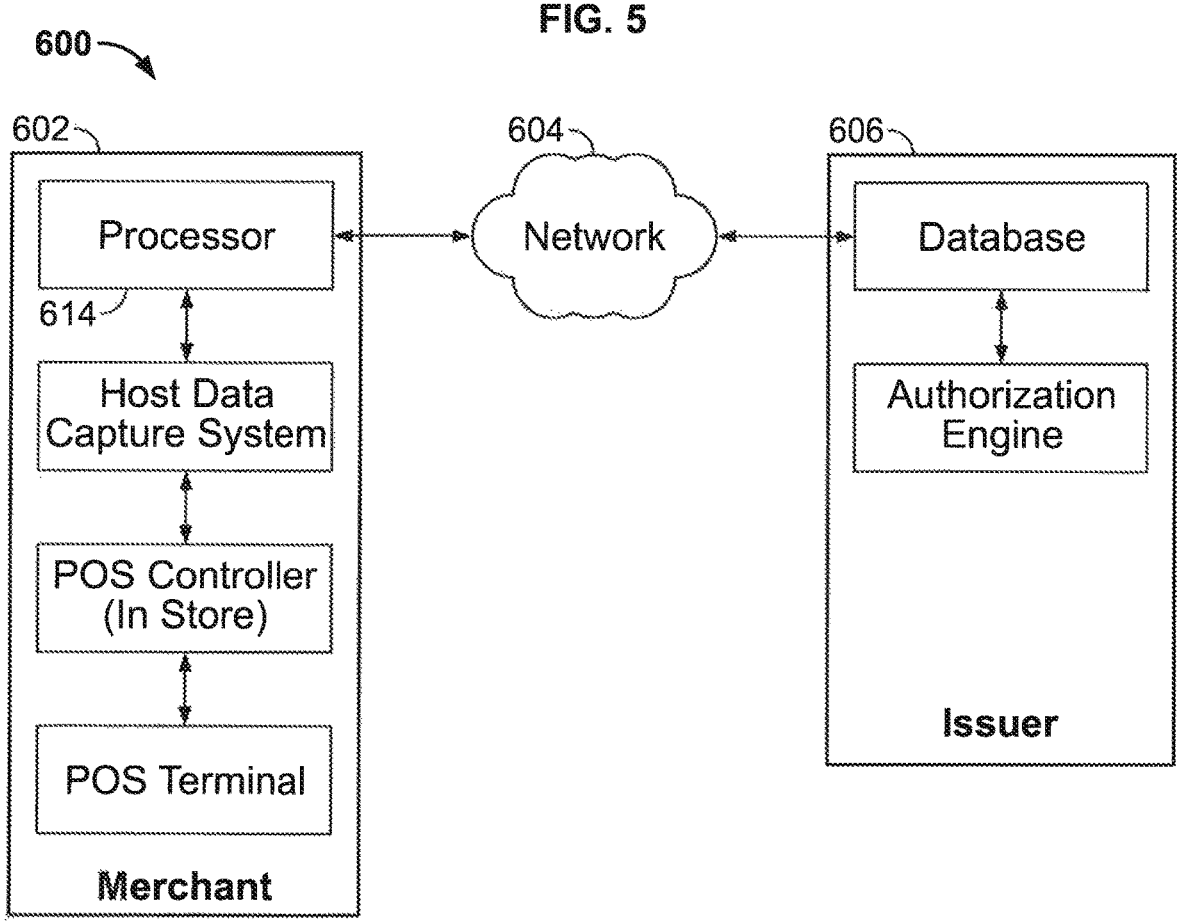
FIG. 6 shows another illustrative system in accordance with principles of the disclosure.

FIG. 6 shows illustrative system 600 for processing and communicating payment instrument and transaction information. System 600 may include merchant component 602, network component 604 and issuer component 606. In general, a system such as 600 may include many merchant components such as 602 and many issuer components such as 606. System 600 may have one or more of the features that are described herein in connection with system 500.

In system 600, processor 614 may be present in merchant component 602. Corresponding processor 514 is present in network component 504 (shown in FIG. 5). Processes in accordance with the principles of the invention may include one or more features of the process illustrated in FIGS. 5-6.

Figure 7:
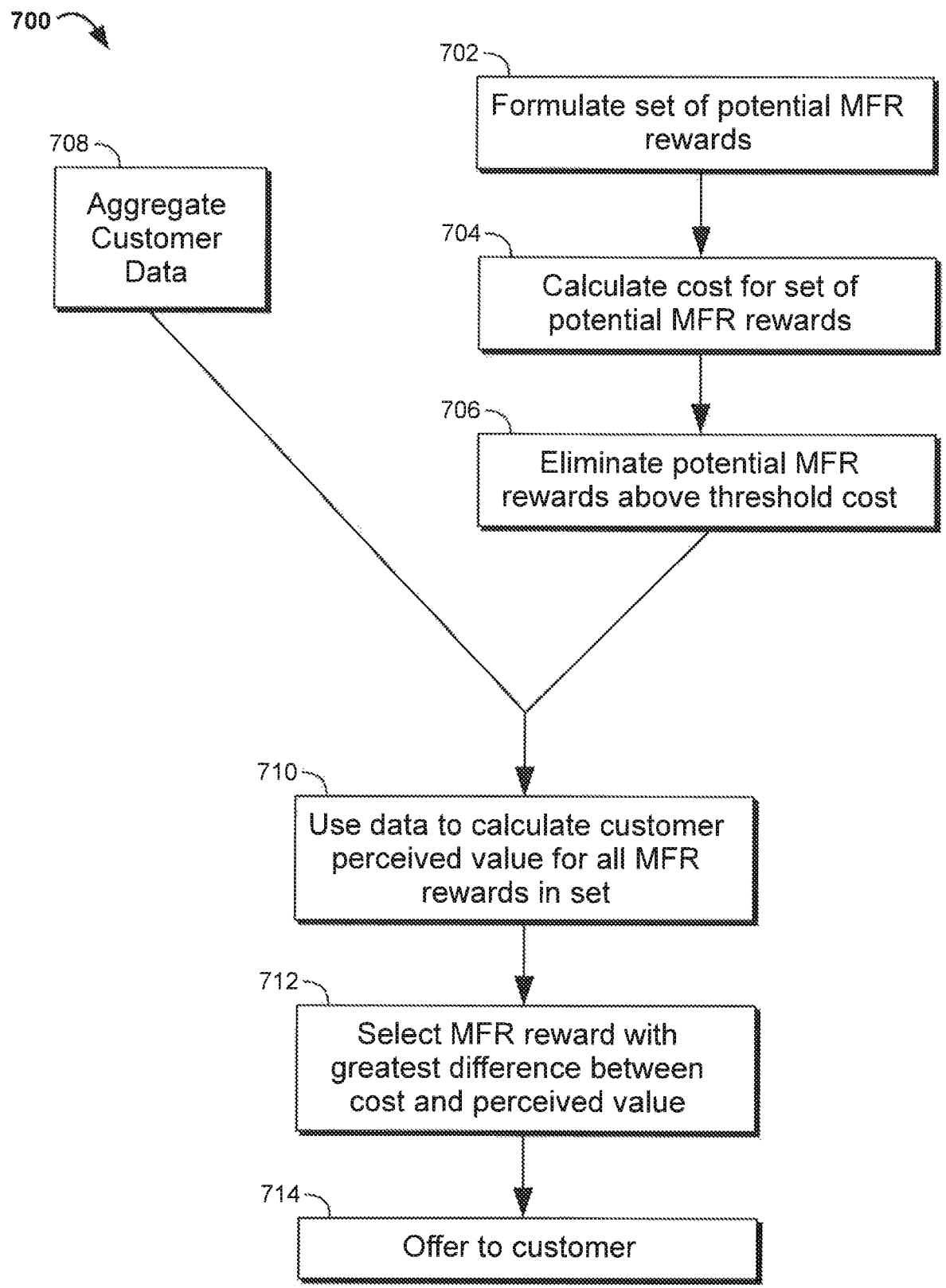
FIG. 7 shows an illustrative flow chart in accordance with principles of the disclosure.

FIG. 7 shows an illustrative flowchart 700 of an exemplary process of formulating an MFR offer. A merchant computer system may initiate the process along two independent tracks. The tracks may be performed in parallel. One track may be steps 702-706. Another track may be step 708.

At step 702, a processor in the merchant computer system may formulate a set of potential MFR rewards to offer to customers. At step 704, the processor may calculate the cost to the merchant for every MFR reward in the set. At step 706, the processor may eliminate any awards from the set whose cost is above a threshold cost. The threshold may be a predetermined cost. The threshold may be a predetermined percentage of a purchase price in a transaction.

Independently of the processing in steps 702-706, the merchant computer system may aggregate customer data, step 708. The data may be aggregated in a database.

In step 710, the merchant computer system may combine the results of steps 708 and 706. Step 710 may include using the data to calculate customer perceived values for all the MFR rewards remaining in the set. At step 712, the merchant computer system may select the MFR reward with the greatest difference between cost to merchant and perceived value to customer. The selected reward may be offered to the customer, step 714.

The steps of methods may be performed in an order other than the order shown and/or described herein. Embodiments may omit steps shown and/or described in connection with illustrative methods. Embodiments may include steps that are neither shown nor described in connection with illustrative methods.

Illustrative method steps may be combined. For example, an illustrative method may include steps shown in connection with another illustrative method.

Apparatus may omit features shown and/or described in connection with illustrative apparatus. Embodiments may include features that are neither shown nor described in connection with the illustrative apparatus. Features of illustrative apparatus may be combined. For example, an illustrative embodiment may include features shown in connection with another illustrative embodiment.

The drawings show illustrative features of apparatus and methods in accordance with the principles of the invention. The features are illustrated in the context of selected embodiments. It will be understood that features shown in connection with one of the embodiments may be practiced in accordance with the principles of the invention along with features shown in connection with another of the embodiments.

One of ordinary skill in the art will appreciate that the steps shown and described herein may be performed in other than the recited order and that one or more steps illustrated may be optional. The methods of the above-referenced embodiments may involve the use of any suitable elements, steps, computer-executable instructions, or computer-readable data structures. In this regard, other embodiments are disclosed herein as well that can be partially or wholly implemented on a computer-readable medium, for example, by storing computer-executable instructions or modules or by utilizing computer-readable data structures.

Thus, methods and systems for POS terminals with free form rewards architecture are provided. Persons skilled in the art will appreciate that the present invention can be practiced by other than the described embodiments, which are presented for purposes of illustration rather than of limitation, and that the present invention is limited only by the claims that follow.

What is claimed is:

1. A merchant-funded rewards (MFR) payment system comprising:
   a point-of-sale (POS) terminal, said POS terminal that enables a customer to purchase one or more products from a merchant, said products comprising goods and/or services;
   a payment instrument, said payment instrument that enables the customer to initiate a credit transaction at the POS terminal for said purchase, the credit transaction comprising:
      a financial entity that is an issuer, said issuer that extends payment credit to the customer for a purchase, and collects a monetary sum from the customer as compensation for the payment credit;
      a processing network, said processing network that:
         enables the merchant to communicate to the issuer a request for authorization of the credit transaction;
         enables the issuer to communicate to the merchant a response to the authorization request, said response either granting or denying the authorization; and
         settles the credit transaction, said settlement comprising debiting the issuer a first monetary amount, crediting at least a part of the first monetary amount to the merchant as a second monetary amount, the difference between the second monetary amount and a purchase price of the products in the credit transaction being a transaction cost; and
      a transaction reward, said transaction reward that is provided to the customer upon using the payment instrument for a purchase, wherein the transaction reward is associated with a first value received by the customer, and a second value corresponding to the cost to a rewarder in providing the transaction reward, and the first value is higher than the second value, and wherein said rewarder is associated with a rewards program, and said rewarder is either an issuer in a conventional rewards program, or a merchant in an MFR rewards program;
   a merchant computer system comprising at least one processor;
   at least one notifying device; and
   a bypass transaction processing network;
   wherein:
      the merchant computer system is configured to formulate an offer to offer to the customer, the offer comprising one or more MFR transaction rewards, a qualifying payment instrument, a qualifying POS terminal, and details of the transaction reward;
      said offer is communicated to at least one notifying device, said notifying device that is configured to display said offer to the customer and receive a customer selection from the customer vis-a-vis a current purchase, said customer selection comprising the opting-in to one or more of the offered MFR transaction rewards;
      the customer selection to opt-in to an MFR transaction award:
         terminates a default enrollment of the customer in a conventional rewards program vis-a-vis the current purchase; and
         triggers an enrollment of the payment instrument in the bypass transaction processing network;
      a purchase by the customer, after the customer selection of the opt-in, with a qualifying payment instrument at a qualifying POS terminal:
         enables the customer to receive the MFR transaction reward; and
         the bypass transaction processing network reduces a transaction cost of the purchase;
      the merchant computer system is configured to formulate an offer, the merchant computer system being configured to:
         formulate a set of potential MFR transaction rewards;
         eliminate, from the set, the MFR transaction rewards comprising a cost to the merchant above a threshold cost, said threshold cost that is a predetermined amount or a predetermined percentage of the purchase price of the products being purchased;
         calculate, for each MFR transaction award remaining in the set, the customer received value, based on the data in the database;
         further calculate, for each MFR transaction award remaining in the set, the difference between the first, customer received, value, and the second, merchant cost, value;
         select, from the MFR transaction awards remaining in the set, the MFR transaction award with the greatest difference between first and second values; and
         communicate the selected MFR transaction award to the notifying device to offer to the customer.

2. The system of claim 1, wherein the merchant computer system further comprises a database, and the data in the database is used in formulating one or more of the MFR transaction rewards offered to the customer.

3. The system of claim 2, wherein the database includes customer geolocation data.

4. The system of claim 3, wherein the database is updated when a consumer enters a predetermined location.

5. The system of claim 2, wherein the database includes customer spend analysis data.

6. The system of claim 2, wherein the database includes customer social media data.

7. The system of claim 2, wherein the database includes market data.

8. The system of claim 1, wherein the merchant computer system formulates at least one of the offered MFR transaction rewards to incentivize a customer behavior.

9. The system of claim 8, wherein the customer behavior includes online pre-ordering of products.

10. The system of claim 8, wherein the customer behavior includes purchasing products from a store whose sales performance is below a predetermined threshold.

11. The system of claim 8, wherein the customer behavior includes purchasing products whose sales performance is below a predetermined threshold.

12. The system of claim 8, wherein the customer behavior includes purchasing products at certain times, said certain times during which sales performance is below a predetermined threshold.

\* \* \* \* \*